US012209544B1

(12) United States Patent
McCarthy, Jr. et al.

(10) Patent No.: US 12,209,544 B1
(45) Date of Patent: Jan. 28, 2025

(54) ENGINE BRAKING IN HYDROGEN INTERNAL COMBUSTION ENGINES

(71) Applicant: Eaton Intelligent Power Limited, Dublin (IE)

(72) Inventors: James E. McCarthy, Jr., Kalamazoo, MI (US); Mihai Dorobantu, Mission Viejo, CA (US); Kevin Snyder, Tekonsha, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/732,382

(22) Filed: Jun. 3, 2024

Related U.S. Application Data

(60) Provisional application No. 63/623,008, filed on Jan. 19, 2024, provisional application No. 63/603,993, filed on Nov. 29, 2023.

(51) Int. Cl.

| | |
|---|---|
| ***F02D 41/00*** | (2006.01) |
| ***F02B 37/16*** | (2006.01) |
| ***F02B 37/22*** | (2006.01) |
| ***F02B 39/04*** | (2006.01) |
| ***F02B 39/10*** | (2006.01) |
| ***F02B 39/12*** | (2006.01) |
| ***F02D 13/02*** | (2006.01) |
| ***F02D 13/04*** | (2006.01) |

(52) U.S. Cl.
CPC .......... *F02D 41/0005* (2013.01); *F02B 37/16* (2013.01); *F02B 37/225* (2013.01); *F02B 39/04* (2013.01); *F02B 39/10* (2013.01); *F02B 39/12* (2013.01); *F02D 13/0226* (2013.01); *F02D 13/04* (2013.01); *F02D 41/0007* (2013.01); *F02D 2200/04* (2013.01)

(58) Field of Classification Search
CPC ....... F02D 43/10; F02D 41/0007; F02D 13/04
See application file for complete search history.

(56) References Cited

U.S. PATENT DOCUMENTS

| | | | |
|---|---|---|---|
| 5,305,714 | A | 4/1994 | Sekiguchi et al. |
| 7,740,010 | B2 | 6/2010 | Fulton et al. |
| 8,281,587 | B2 | 10/2012 | Xin et al. |
| 10,526,928 | B2 | 1/2020 | Wetzel et al. |
| 10,544,708 | B2 | 1/2020 | McCarthy, Jr. et al. |
| 10,570,834 | B2 | 2/2020 | Dane |
| 10,968,788 | B2 | 4/2021 | McCarthy, Jr. et al. |
| 11,199,162 | B2 | 12/2021 | McCarthy, Jr. et al. |
| 11,286,818 | B2 | 3/2022 | McCarthy, Jr. et al. |
| 11,300,015 | B2 | 4/2022 | McCarthy, Jr. et al. |
| 11,300,061 | B2 | 4/2022 | McCarthy, Jr. et al. |

(Continued)

FOREIGN PATENT DOCUMENTS

| | | | |
|---|---|---|---|
| WO | 2014055821 | A1 | 4/2014 |
| WO | 2014150265 | A2 | 9/2014 |

(Continued)

*Primary Examiner* — Ngoc T Nguyen
(74) *Attorney, Agent, or Firm* — Merchant & Gould P.C.

(57) ABSTRACT

A method of operating a system including a hydrogen internal combustion engine and a supercharger between a normal operating mode and an engine braking mode. In the normal operating mode, the supercharger operates at a first rotational speed to deliver air to an intake manifold of the engine. In the engine braking mode, the supercharger operates at a second rotational speed to deliver air to the intake manifold and a restriction is provided to increase a pressure ratio across the supercharger.

26 Claims, 17 Drawing Sheets

(56) References Cited

U.S. PATENT DOCUMENTS

| | | | |
|---|---|---|---|
| 11,391,186 | B2 | 7/2022 | Contarin et al. |
| 11,578,673 | B2 | 2/2023 | McCarthy, Jr. et al. |
| 2020/0018197 | A1 | 1/2020 | McCarthy, Jr. et al. |
| 2023/0235686 | A1 | 7/2023 | McCarthy, Jr. et al. |

FOREIGN PATENT DOCUMENTS

| | | | |
|---|---|---|---|
| WO | 2016118482 | A1 | 7/2016 |
| WO | 2017106330 | A2 | 6/2017 |
| WO | 2018013973 | A1 | 1/2018 |
| WO | 2023228569 | A1 | 11/2023 |

ENGINE BRAKING IN HYDROGEN INTERNAL COMBUSTION ENGINES

RELATED APPLICATIONS

This application claims priority to U.S. Provisional Patent Application Ser. Nos. 63/623,008, filed Jan. 19, 2024; and 63/603,993, filed Nov. 29, 2023, the entireties of which are incorporated by reference herein.

BACKGROUND

A conventional engine brake system focuses on precise control of the engine's operation to achieve effective braking. This system commonly employs a compression release brake, which releases pressure in the cylinders during the compression stroke, creating resistance and slowing down the engine. Additionally, the system may involve throttle closure to further reduce power. Integration with the transmission, whether manual or automatic, enhances the braking effect through optimized gear selection. The overall design considers a balance between braking performance, fuel efficiency, noise control, and compliance with emission standards to deliver an effective engine braking solution.

SUMMARY

Presently, vehicles with internal combustion engines (ICE) often have a compression ratio around 18:1 with braking power to match, which is needed for safe and effective braking of many ICE powered vehicles. Hydrogen ICE (H2 ICE) has a reduced compression ratio to prevent auto-ignition, of about 12:1 or 11:1. H2 ICE is able to match the propulsion power of traditional engines with this reduced compression ratio, but the braking power is significantly reduced, on the order of 25-30%. As disclosed herein, supercharging air within the cylinder during braking operations increases the available braking power.

A method of operating a system between a normal operating mode and an engine braking mode can include a hydrogen internal combustion engine and a supercharger. In the normal operating mode, the supercharger operates at a first rotational speed to deliver air to an intake manifold of the engine. In the engine braking mode, the supercharger operates at a second rotational speed to deliver air to the intake manifold and a restriction is provided to increase a pressure ratio across the supercharger.

In one example method of decompression braking in a hydrogen internal combustion engine (H2 ICE), the method includes: drawing air into a cylinder of the H2 ICE during a first intake stroke by a piston; adding, during the first intake stroke, additional air into the cylinder with an air compressor; compressing the air in the cylinder during a compression stroke by the piston; and releasing the compressed air from the cylinder.

In some examples, the method includes increasing pressure in the cylinder with the air compressor when the piston is at bottom dead center of the cylinder.

In some examples, the air compressor is one of a supercharger, a booster, an e-booster, a turbo, and an e-turbo.

In some examples, the air compressor is the supercharger and the supercharger comprises a clutch.

In some examples, the clutch is a three-way clutch.

In some examples, the three-way clutch comprises: a neutral position; a first gearing position for driving; and a second gearing position for braking.

In some examples, the second gearing position operates the supercharger at a higher speed than the first gearing position.

In some examples, the air compressor comprises a ratio device with at least two speeds.

In some examples, the at least two speeds comprise a first speed for driving operations and a second, faster speed for braking operations.

In some examples, the air compressor exerts a parasitic load on the H2 ICE.

In some examples, the air compressor comprises a throttle valve in an inlet stream.

In some examples, the H2 ICE has a compression ratio of no more than 17:1.

In some examples, the H2 ICE has a compression ratio is within a range of 10:1 to 13:1.

In some examples, the method includes drawing air into the cylinder during a second intake stroke by the piston, wherein the H2 ICE has a four-revolution cycle of a crankshaft of H2 ICE, and the second intake stroke is a third revolution of the four-revolution cycle; adding, during the second intake stroke, additional air into the cylinder with the air compressor; compressing the air in the cylinder during an exhaust stroke by the piston; and releasing the compressed air from the cylinder.

A system for decompression braking can include a hydrogen internal combustion engine (H2 ICE) having at least one cylinder, the at least one cylinder including a piston and an intake valve; an air compressor in communication with the intake valve; and a controller having a propulsion mode and a braking mode, wherein the air compressor is operated by the controller, operating in the braking mode, to supply air to the cylinder during an intake stroke by the piston.

In some examples, the intake stroke has a height and a duration and at least one of the height and the duration is reduced during the braking mode.

A method of decompression braking in an internal combustion engine (ICE), the method comprising: drawing air into a cylinder of the ICE during a braking intake stroke by a piston; adding, during the braking intake stroke, additional air into the cylinder with an air compressor when the piston is at bottom dead center of the cylinder; compressing the air in the cylinder during a compression stroke by the piston; and releasing the compressed air from the cylinder.

In some examples, the piston performs a standard intake stroke during propulsion, the standard intake stroke having a standard height and a standard duration, and the braking intake stroke has a braking height and a braking duration, where in at least one of the braking height and the braking duration is reduced compared with the standard height or standard duration.

A method of operating a system including a hydrogen internal combustion engine and a supercharger between a normal operating mode and an engine braking mode can include: operating the system in the normal operating mode, wherein the supercharger operates at a first rotational speed to deliver air to an intake manifold of the engine; and operating the system in the engine braking mode, including operating the supercharger at a second rotational speed to deliver air to the intake manifold; and providing a restriction to increase a pressure ratio across the supercharger. The engine braking mode further including: drawing air into a cylinder of the engine from the supercharger during a first intake stroke by a piston; compressing the air in the cylinder during a compression stroke by the piston; and releasing the compressed air from the cylinder.

In some examples, the step of providing a restriction includes providing a valve arrangement located in either an inlet airflow pathway upstream of the supercharger or an outlet airflow pathway downstream of the supercharger, and includes operating the valve arrangement to increase the pressure ratio across the supercharger.

In some examples, the valve arrangement is a two-way valve or a three-way valve.

In some examples, the first rotational speed is less than the second rotational speed.

In some examples, the system includes a throttle valve arrangement, a supercharger bypass valve arrangement, and a separate restriction valve arrangement, wherein the step of providing a restriction includes operating the restriction valve arrangement.

In some examples, the restriction valve arrangement includes a plurality of restriction valve arrangements.

In some examples, the restriction valve arrangement is located between the engine intake manifold and the supercharger.

In some examples, the step of providing a restriction includes operating a throttle valve arrangement and a supercharger bypass arrangement to increase the pressure ratio across the supercharger.

In some examples, the throttle valve arrangement is located between the supercharger and the engine intake manifold.

In some examples, a mass airflow sensor is located between the supercharger and the engine intake manifold, and wherein one or both the throttle valve arrangement and the bypass valve arrangement is at least partially operated based on an input from the mass airflow sensor.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
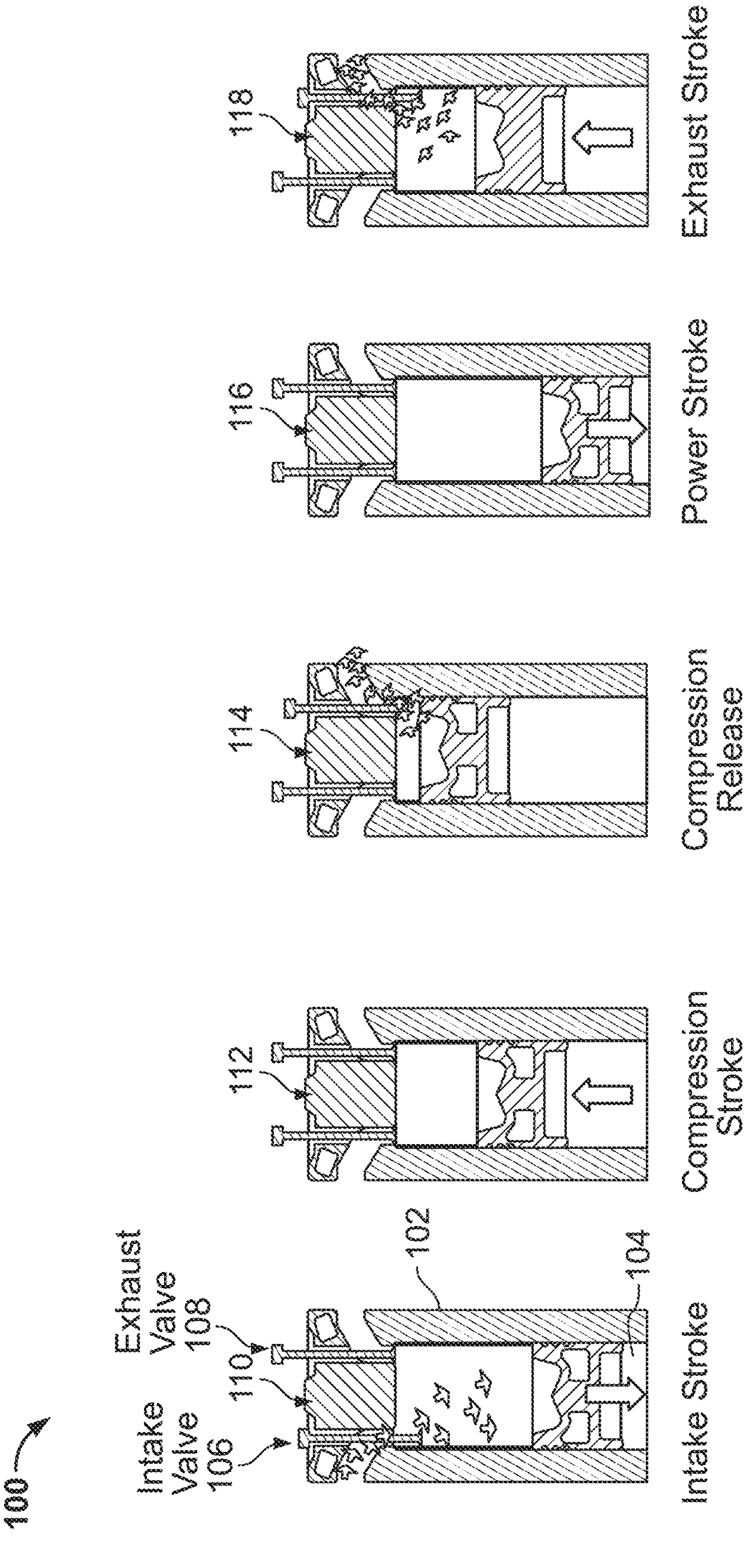
FIG. 1 is a process flow of a typical four-stroke internal combustion engine (ICE) cycle during engine braking.

Reference will now be made in detail to exemplary aspects of the present disclosure that are illustrated in the accompanying drawings. Wherever possible, the same reference numbers will be used throughout the drawings to refer to the same or like parts.

Hydrogen internal combustion engines (H2 ICE) represent a class of internal combustion engines that use hydrogen as a fuel source instead of traditional hydrocarbon-based fuels like gasoline or diesel. These engines operate on the same basic principles as conventional internal combustion engines, but with some key differences in fuel properties and combustion characteristics.

Gaseous hydrogen is typically used as the primary fuel. Hydrogen is considered a clean fuel because its combustion produces only water vapor and heat, making it an environmentally friendly alternative. The engine's design is modified to accommodate the unique properties of hydrogen, such as its wide flammability range and high flame speed.

The combustion process in a hydrogen internal combustion engine involves the mixing of hydrogen with air in the engine's cylinders. Hydrogen's unique combustion characteristics allow for flexibility in the design of hydrogen-powered engines. Hydrogen engines may often operate at higher compression ratios to take advantage of hydrogen's high octane rating. However, unlike traditional hydrocarbon fuels like diesel, hydrogen does not have the same issues with pre-ignition or knocking. As a result, hydrogen engines can also operate effectively with lower compression ratios compared to diesel engines. Lower compression ratios may be advantageous for certain hydrogen engine designs.

In some cases, a H2 ICE is configured with a lower compression ratio to prevent auto-ignition of the hydrogen fuel. Lower compression ratios can also be advantageous in terms of reducing mechanical stress on engine components and potentially simplifying the overall engine design. Hydrogen combustion tends to produce lower levels of nitrogen oxides (NOx), which are a major contributor to air pollution. Lower compression ratios in hydrogen engines may also contribute to the reduction of NOx emissions compared to diesel engines. Lower compression ratios may have further implications for the materials used in engine construction. Engine components need to be designed to handle the specific demands of hydrogen combustion, and lower compression ratios may influence the overall stress on these materials. In some implementations of a H2 ICE, a reduced compression ratio may be necessary for effective operation. For example, in a spark ignited H2 ICE, combustion may require a decrease in compression ratio.

Though lowering the compression ratio comes with a number of advantages, it's influence in some areas of the engine's operation require additional design considerations. In the case of engine braking, a reduced compression ratio lowers the braking power available during engine braking operations. The available cylinder pressure, which determines the available braking power, is driven by compression ratio when no fuel is supplied (as in a braking scenario). The potential power of an engine braking event is therefore reduced as the compression ratio is reduced.

Disclosed herein are methods and systems for improved engine braking power. In embodiments, an air compressor, such as a supercharger, increases pressure in a cylinder during an intake event such that when the piston is near top dead center (TDC) and the exhaust valve opens for braking, there is more braking power. In embodiments, the increase in pressure is supplied when a piston is near bottom dead center (BDC) of the cylinder. The disclosed system and methods may provide particular advantages for H2 ICE engine braking, and even more particular advantages for H2 ICE's with a low compression ratio, but the principles of the present disclosure will be applicable to and effective with a variety of engines.

Though the present disclosure focuses on use of an air compressor to increase braking power, it is noted that the use of such a compressor (e.g., a supercharger) may have additional advantages in operation of the H2 ICE. For example, inclusion of a supercharger may improve the efficiency of an H2 ICE running with high lambda. The term "lambda" in the context of internal combustion engines refers to the air-fuel ratio, specifically the ratio of the actual air-fuel mixture to the stoichiometric air-fuel ratio. The stoichiometric ratio is the chemically ideal ratio at which complete combustion occurs. A lambda value of 1.0 corresponds to a stoichiometric air-fuel ratio. When the engine is running with a lambda greater than 1.0, it means that there is excess air in the mixture compared to the stoichiometric ratio. This condition is often referred to as running "lean." In a lean mixture, combustion temperatures tend to be higher, which can affect engine performance and emissions. Lean-burn engines are often equipped with technologies such as exhaust gas recirculation (EGR) or catalytic converters to mitigate the impact on emissions.

Referring now to FIG. 1, a process flow 100 of a typical four-stroke ICE cycle during engine braking is shown. The process occurs in a cylinder 102 through operation of a piston 104, an intake valve 106, and an exhaust valve 108. At intake stroke 110, air is drawn into cylinder 102 through intake valve 106 as piston 104 is withdrawn. At compression stroke 112, work is performed to compress the air in cylinder 102 as piston 104 is moved toward the top of cylinder 102. During compression release 114, rather than adding fuel to be combusted to the cylinder, as would occur during drive operations of the engine, fuel is not added to cylinder 102 and pressure is release through exhaust valve 108. At power stroke 116, piston 104 is again withdrawn, but there is no expansion and no positive power as would be generated following a combustion event. At exhaust stroke 118, remaining air in cylinder 102 is expelled through exhaust valve 108.

Figure 2:
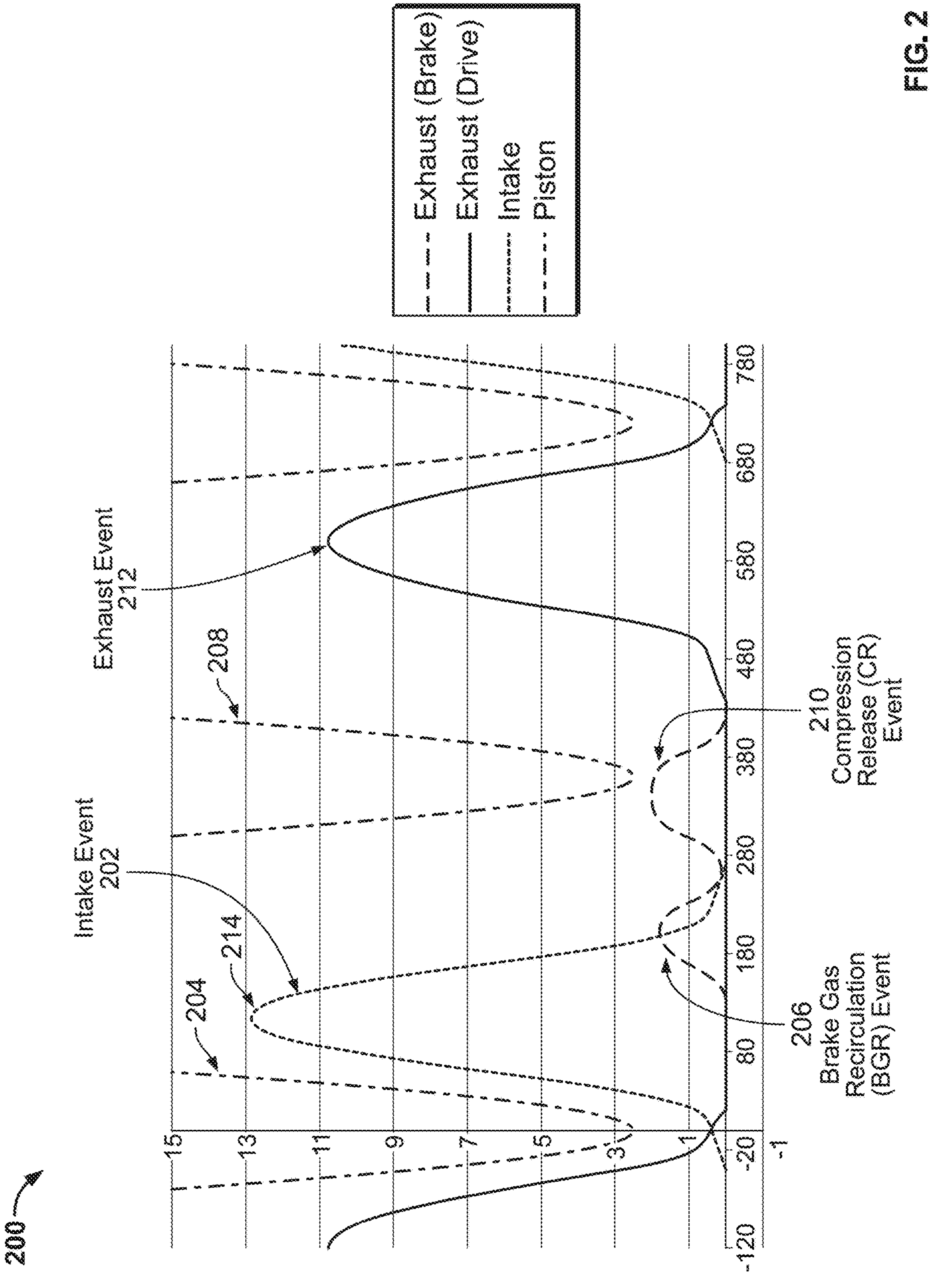
FIG. 2 is a graph depicting a typical decompression brake lift profile.

Referring now to FIG. 2, a graph 200 depicting a typical decompression brake lift profile is shown. Intake event 202, which may correspond to intake stroke 110 of FIG. 1, follows a first piston stroke 204 as air is drawn into the cylinder. During intake event 202, the piston moves down the cylinder, creating a vacuum that allows the intake valve to open. Air is drawn into the cylinder as the piston reaches bottom dead center (BDC). BDC refers to the position of the piston in an internal combustion engine at the lowest point of its travel in the cylinder during the engine's four-stroke cycle.

Occurring around the end of intake event 202, but prior a second piston stroke 208, a brake gas recirculation (BGR) event 206 occurs. A BGR event can be accomplished by opening an exhaust or auxiliary valve near BDC of the intake or expansion stroke of the piston and keeping the exhaust or auxiliary valve open during the first portion of the exhaust or compression stroke of the engine. Opening the exhaust or auxiliary valve during this portion of the engine cycle may allow exhaust gas to flow into the engine cylinder from the relatively higher-pressure exhaust manifold. The introduction of exhaust gases from the exhaust manifold into the cylinder may pressurize the cylinder with a charge faster than it would otherwise occur during the compression stroke. The increased gas pressure in the engine cylinder may increase the braking power produced by a subsequent compression-release event.

A compression release (CR) event 210 may occur just prior to or in conjunction with the second piston stroke 208, which may be associated with a power stroke, such as power stroke 116 of FIG. 1. During the CR event 210, some pressure from the cylinder may be released, such as through an exhaust valve. This opening of the exhaust valve releases the compressed air in the cylinder to the exhaust system, bypassing a true power stroke which would be driven by combustion of fuel in the cylinder. Without combustion happening in the affected cylinder, there's no power stroke to drive the engine. This lack of power stroke creates a braking effect as the engine acts as an air pump, absorbing energy from the vehicle's motion as the piston withdraws from top dead center (TDC). TDC is the position where the piston reaches its highest point in the cylinder during the compression stroke. At TDC, the piston is momentarily stationary before it starts moving downward again during the power stroke. An exhaust event 212 ends the decompression braking profile as remaining air in the cylinder is released through an exhaust valve.

As disclosed herein, a supercharge event 214 is added to the braking cycle and introduces additional air into the cylinder during the intake event 202. In embodiments, supercharge event 214 may occur at BDC. Air may be supplied for the supercharge event 214 from an air compressor, such as a supercharger, integrated with the ICE. In addition to providing additional braking power by increasing the pressure within the cylinder to be released, the air compressor may exert a parasitic load on the engine which increases the overall braking load. This load varies with the configuration of the compressor and engine and may be significant in embodiments, e.g., up to 20 KW, up to 25 KW, up to 50 KW, up to 60 KW, up to 70 KW, etc. in various embodiments. In some examples, the air compressor includes a supercharger in series with a turbocharger, and in some examples, a supercharger that is downstream from a turbocharger.

In embodiments, inclusion of supercharge event 214 is associated with the removal or elimination of BGR event 206, as the supercharge event provides a more effective pressure increase than the BGR event. As the air supplied from the air compressor is not heated exhaust, such as that supplied by a BGR event, it has greater density and therefore provides more power than exhaust supplied during a BGR event. Further, in some instances, a BGR event may, in effect, reduce braking power by providing an alternative escape path for the supercharged air in the cylinder. Eliminating the BGR event may be preferable, in embodiments, due to further advantages such as simplification of the valvetrain.

Increasing the pressure in the cylinder during the intake event increases the braking power available during an engine braking cycle. The release of compressed air creates a braking effect as the engine essentially acts as an air pump, absorbing energy from the vehicle's motion, and greater pressure to release results in greater braking power. Further, the addition of air from the air compressor during the supercharge event allows one or both of the intake stroke's height and duration to be reduced. In some instances, such as if a simplified valvetrain is preferred, the intake stroke is not altered from its standard stroke.

Figure 3A:
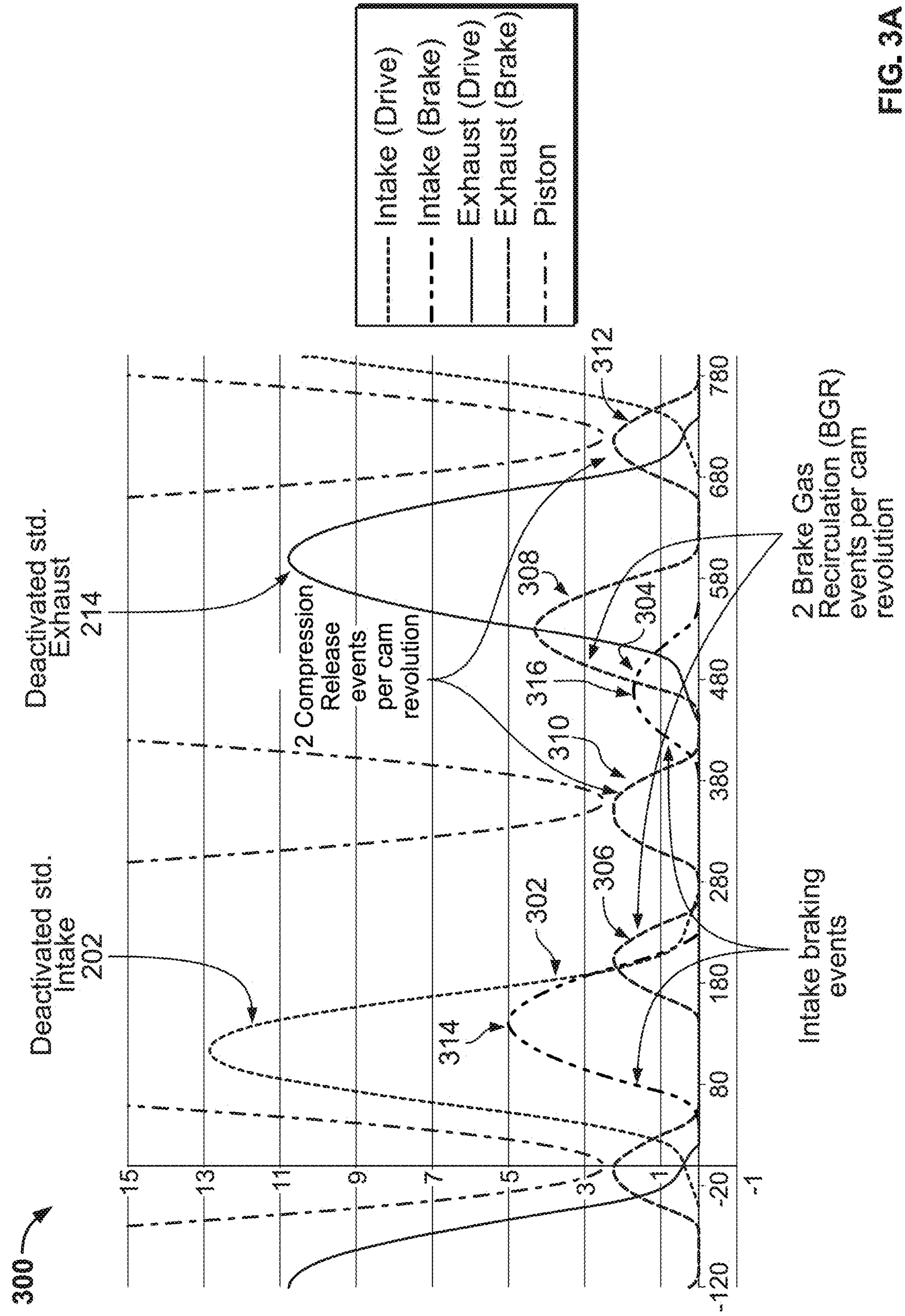
FIG. 3A is a graph depicting a decompression brake lift profile for a two-stroke braking cycle.

Referring now to FIG. 3A, a graph 300 depicting a decompression brake lift profile for a two-stroke braking cycle is shown. This engine braking profile uses the four strokes of the engine cycle to achieve two two-stroke braking cycles. The four-stroke intake event 202 and exhaust event 214 are also shown for reference.

First and second intake events 302, 304, are each associated respectively, with first and second BGR events 306, 308, and first and second CR events 310, 312. In this way, an additional CR event, with associated braking power, is applied during each engine cycle. According to the present disclosure, each intake event 302, 304, may also be associated with a SC event 314, 316 to increase the braking power of each braking event. Addition of supercharge events 314, 316, as disclosed herein, may be particularly advantageous in a two-stroke cycle like that shown in FIG. 3A. By incorporating supercharge events, the additional braking event provided in two-stroke braking can be used without the loss in power per braking event which may otherwise be associated.

Figure 3B:
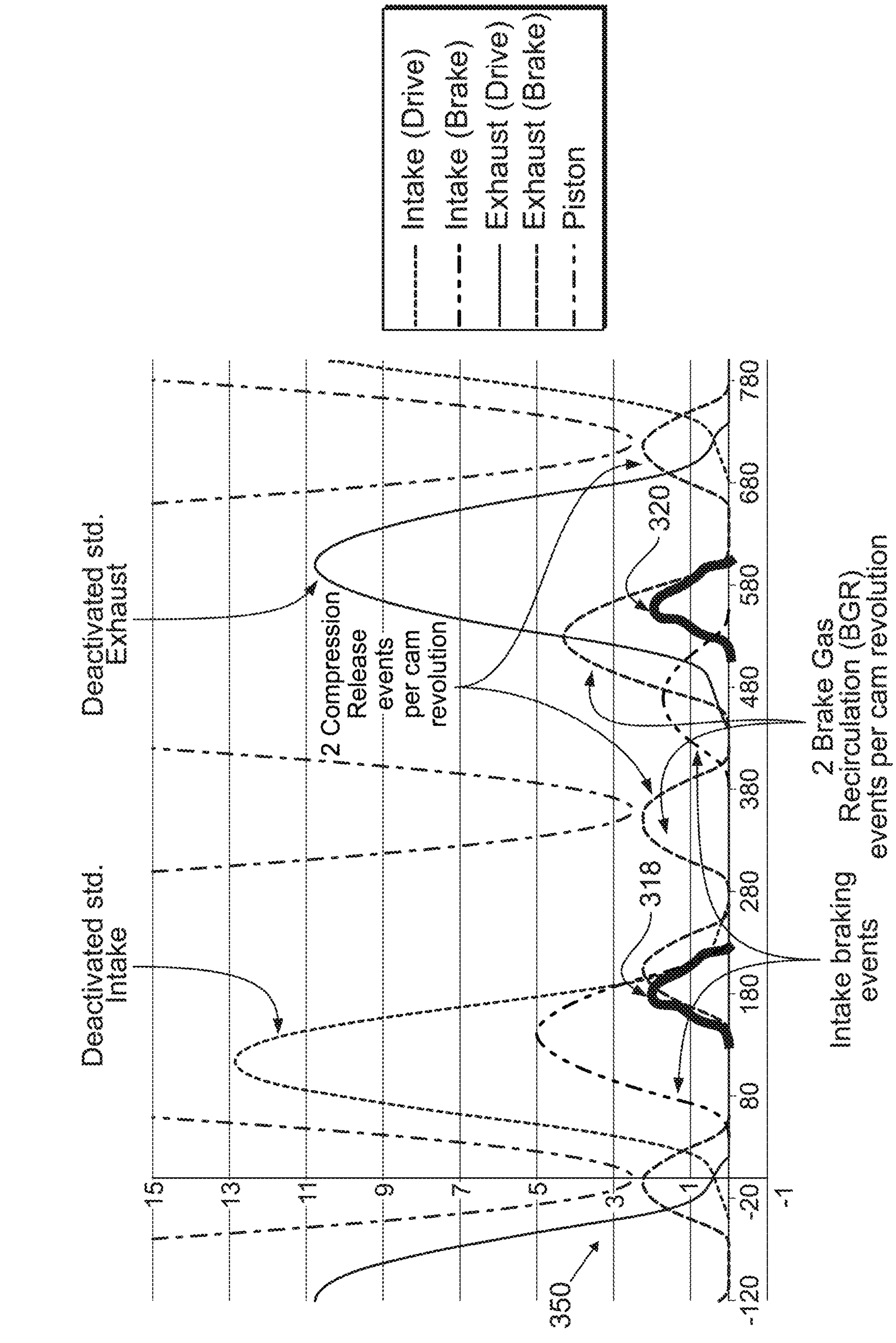
FIG. 3B is a graph depicting another decompression brake lift profile for a two-stroke braking cycle.

Referring now to FIG. 3B, a graph 350 depicting another decompression brake lift profile for a two-stroke braking cycle is shown. In the embodiment depicted in graph 350, the intake stroke is modified to reduce the height and or the duration of the stroke by the addition of air into the cylinder at BDC (180 degrees and 540 degrees in this example). The SC events 318, 320 of this example are shown at BDC and may coincide with the BGR events 306, 308 of traditional two-stroke braking. Accordingly, the BGR event may be eliminated and replaced by the SC events 318, 320 for improved braking performance. In some applications, it advantageous to remove the BGR event to eliminate the possible leakage path through the exhaust, through which the air within the cylinder, provided through the intake, may escape. Due to the increased power provided by the SC events, the intake event overall may need not be as large to achieve the desired braking power.

Figure 4A:
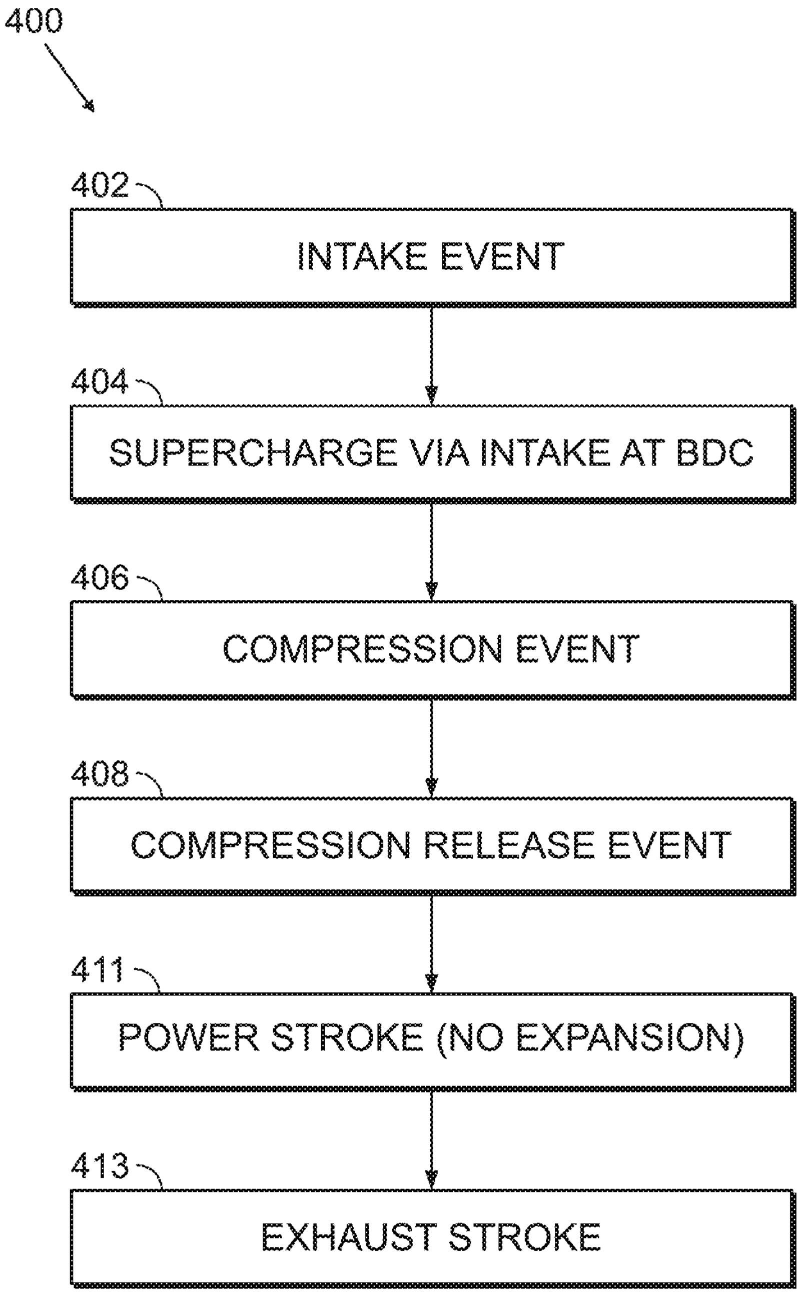
FIG. 4A is a flowchart of an example method of increasing the braking power of a decompression braking cycle.
Figure 4B:
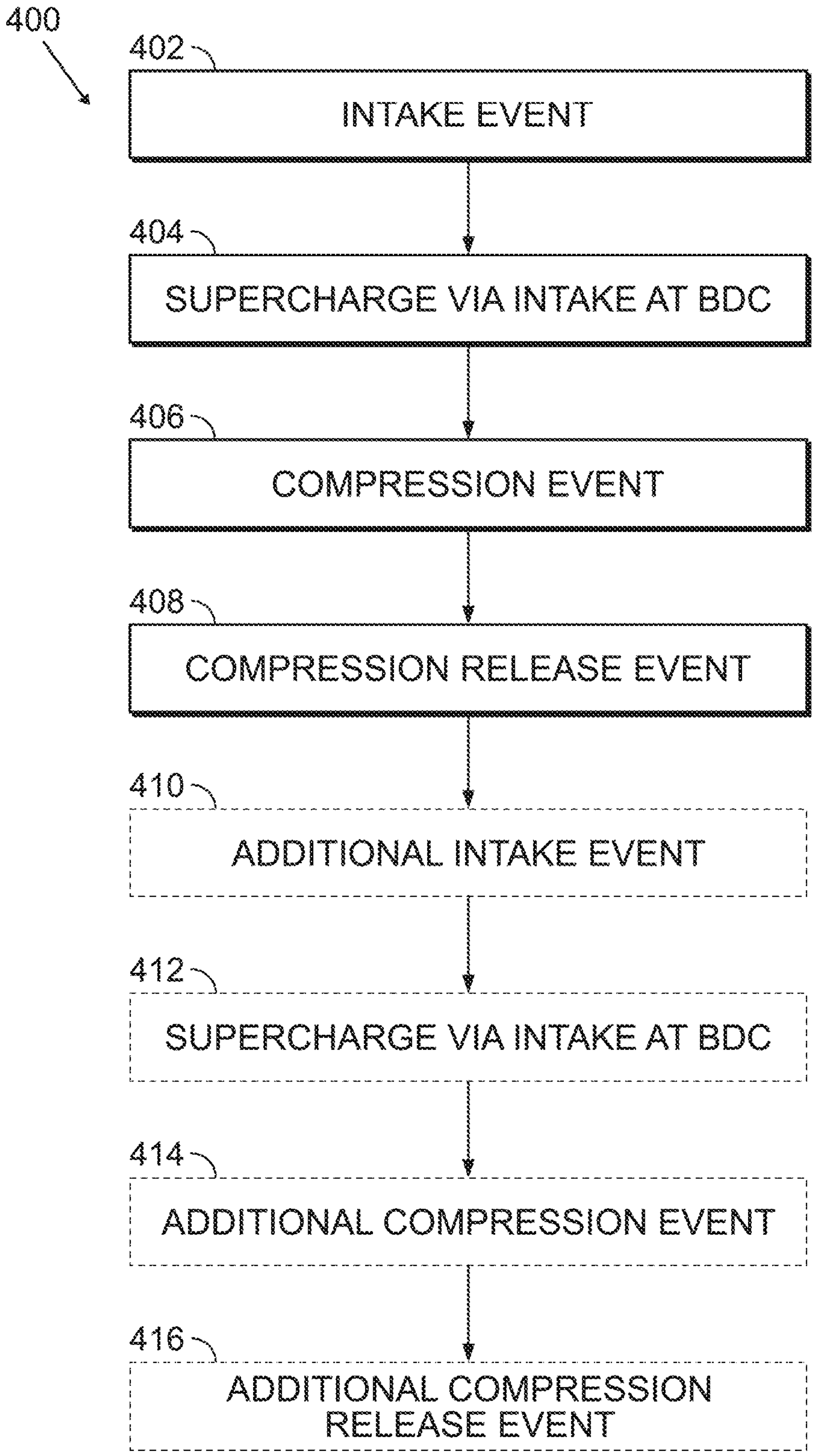
FIG. 4B is a flowchart of another example method of increasing the braking power of a decompression braking cycle.

Referring now to FIGS. 4A and 4B, flowcharts of an example method 400 of increasing the braking power of a decompression braking cycle is shown. In embodiments, the method 400 may be performed by a system controller operating or directing operations of one or more components of the engine. In embodiments, the controller includes a propulsion mode and a braking mode. Each mode may be associated with particular operations and parameters. Method 400 may form a part of the operations of the braking mode.

At operation 402, a piston is withdrawn from the cylinder head and an intake event occurs. At operation 404, a supercharge event is performed during the intake, and compressed air is added to the cylinder from an air compressor. In embodiments, the supercharge event is executed when the piston is at BDC. In embodiments, the supercharge event may occur in conjunction with a BGR event, or there may be no BGR event throughout the decompression braking cycle. At operation 406, the piston is moved toward the top of the cylinder and a compression event occurs, compressing the air in the cylinder as no fuel is present. At operation 408, compressed air is released from the cylinder during a compression release event.

As the piston is withdrawn following the compression release event, a power stroke 411 may occur without expansion or positive power, as in a standard decompression braking cycle. Any remaining air in the cylinder is then exhausted during the engine's standard exhaust stroke 413, before another intake stroke is initiated.

In embodiments where a two-stroke engine braking cycle is used, as the piston is withdrawn following the compression release event 408, an additional, braking only, intake event occurs, at operation 410. A supercharge event is applied and air is added to the additional intake event, at operation 412. At operation 414, an additional compression event compresses the air in the cylinder as the piston moves toward the top of the cylinder (what would be the exhaust stroke in a standard braking cycle). At operation 416, an additional compression release event occurs and the piston may be withdrawn to initiate a next cycle.

Figure 5:
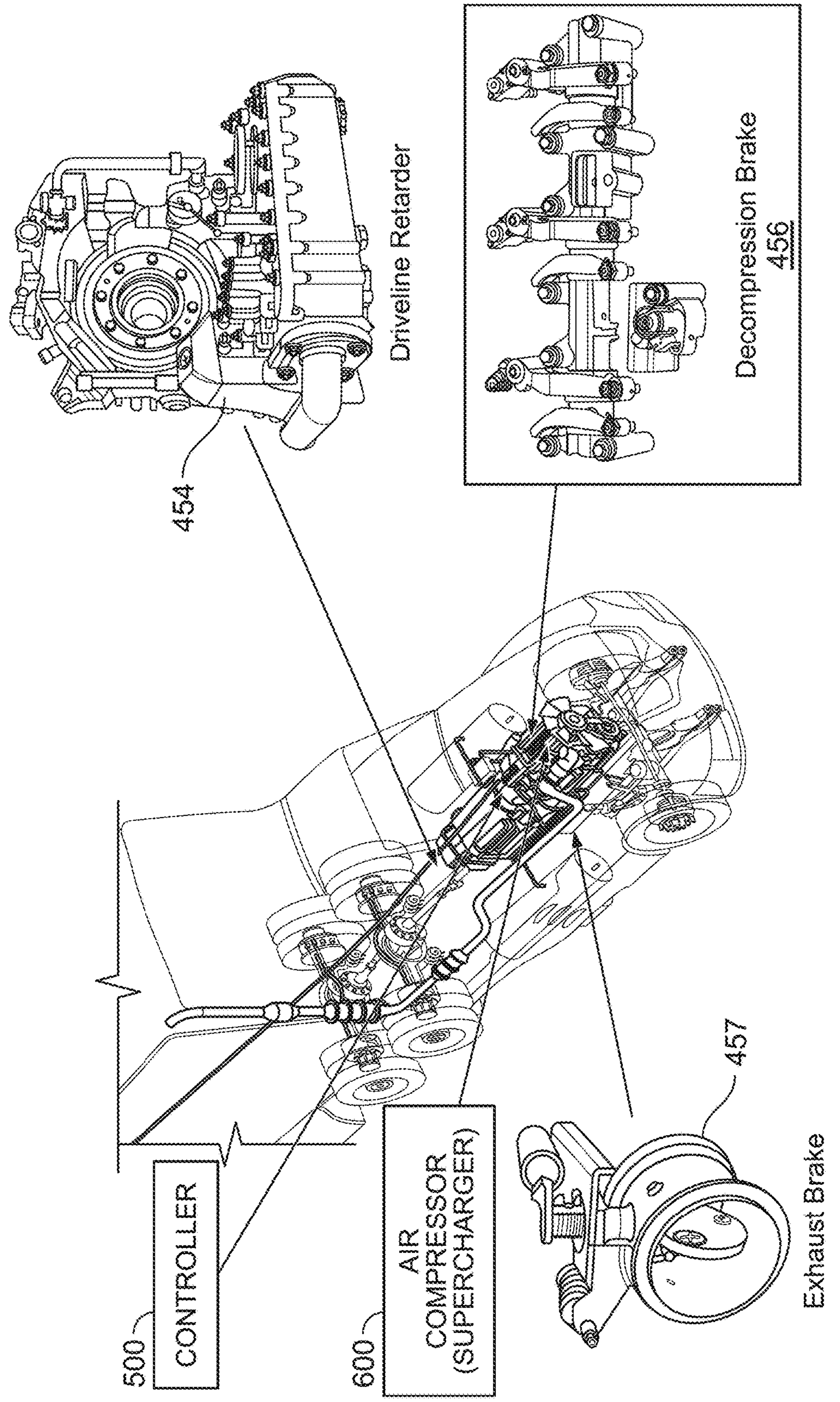
FIG. 5 is an example engine and decompression braking system.

Referring now to FIG. 5, an example engine and decompression braking system is shown. In association with a decompression brake 456, an air compressor 600 (e.g., a supercharger) provides air at the engine intake to raise cylinder pressure during an intake event. A controller 500 provides operation instructions and/or control to the overall engine and/or braking system, or components of the system. In embodiments, controller 500 may execute all of the operations described herein, including braking operations, such as the method 400 discussed above with reference to FIGS. 4A and 4B. Controller 500 may be configured as an electronic vehicle controller, such as the controller 500 of FIG. 8. FIG. 5 also shows an optional driveline retarder 454 and exhaust brake 456 that may also be used in conjunction with the concepts disclosed herein. Driveline retarders 454, decompression brakes 456, and exhaust brakes 457 are well known to those having skill in the art and need not be further described herein.

Example Supercharger 600

Referring now to FIGS. 6A-6E, an example supercharger 600 arrangement, and aspects thereof, are presented. At FIG. 6A, the supercharger 600 is shown as installed in a power plant 700. In the example shown, the power plant 700 is an internal combustion engine 700 configured for operation with hydrogen as a fuel source. As shown, the power plant 700 has an accessory or drive pulley 702 and one or more belts 704 that operably couple the pulley 702 to a corresponding pulley 602 associated with the supercharger 600.

In one aspect, the supercharger 600 can be a fixed displacement supercharger, such as a Roots-type supercharger, that outputs a fixed volume of air per rotation. The increased air output then becomes pressurized when forced into a plenum. A Roots-type supercharger is a volumetric device, and therefore is not dependent on rotational speed in order to develop pressure. The volume of air delivered by the Roots-type supercharger per each rotation of a pair of rotors 626, 628 (illustrated at FIG. 6C) is constant (i.e., does not vary with speed). A Roots-type supercharger 600 can thus develop pressure at low engine and rotor speeds (where the supercharger is powered by the engine) because the Roots-type supercharger effectively functions as a pump with compression of the air delivered by the Roots-type supercharger 600 taking place downstream of the supercharger 600 by increasing the mass of air in the fixed volume engine plenum. Alternatively, the supercharger 600 can be configured as a centrifugal-type supercharger that compresses the air as it passes through the supercharger 600, but with the compression and thus the volume of air delivered to a throttle body 24 and air pressure in the plenum being dependent on compressor speed.

Figure 6A:
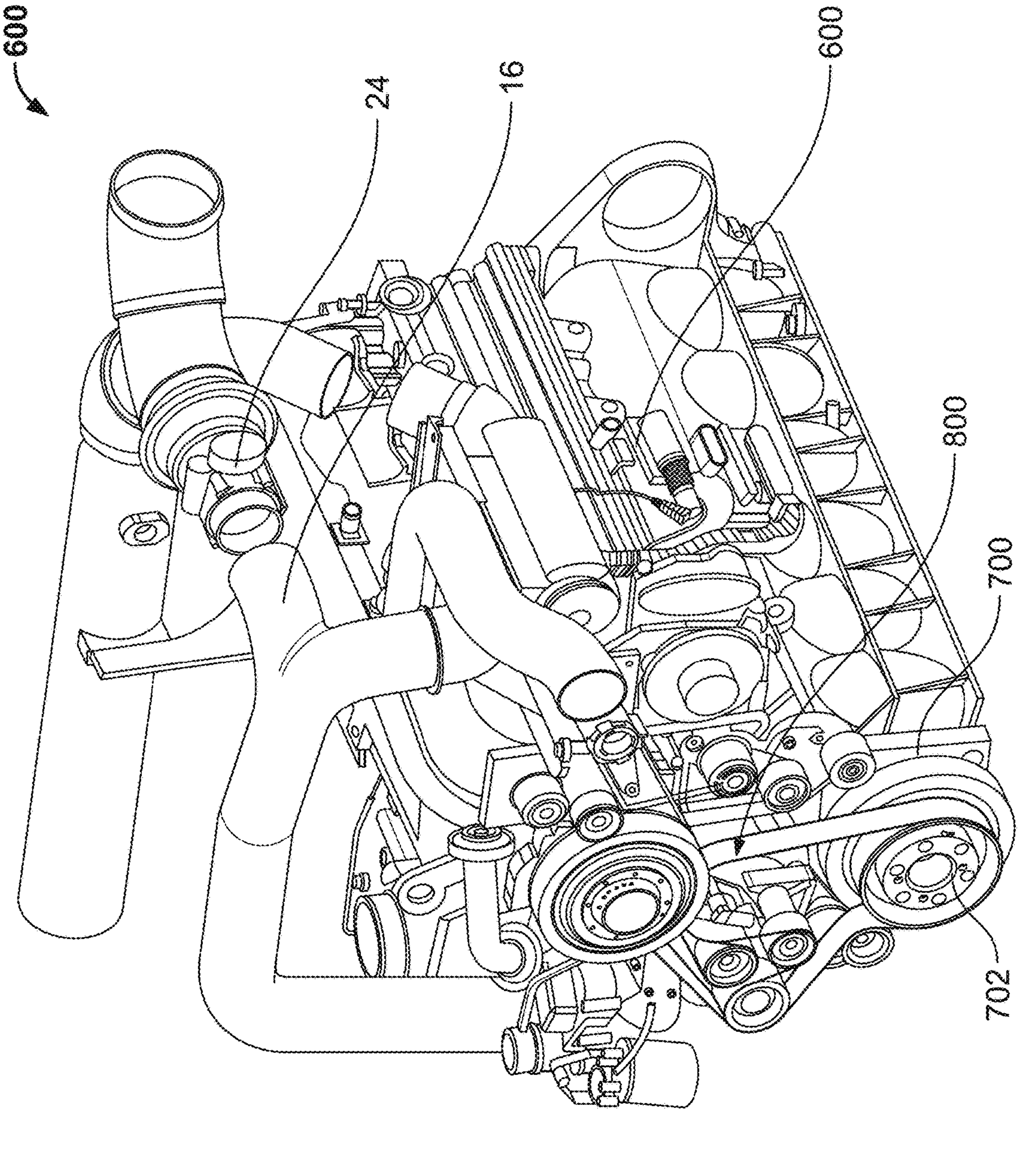
FIG. 6A is an example supercharger arrangement in an engine.
Figure 6B:
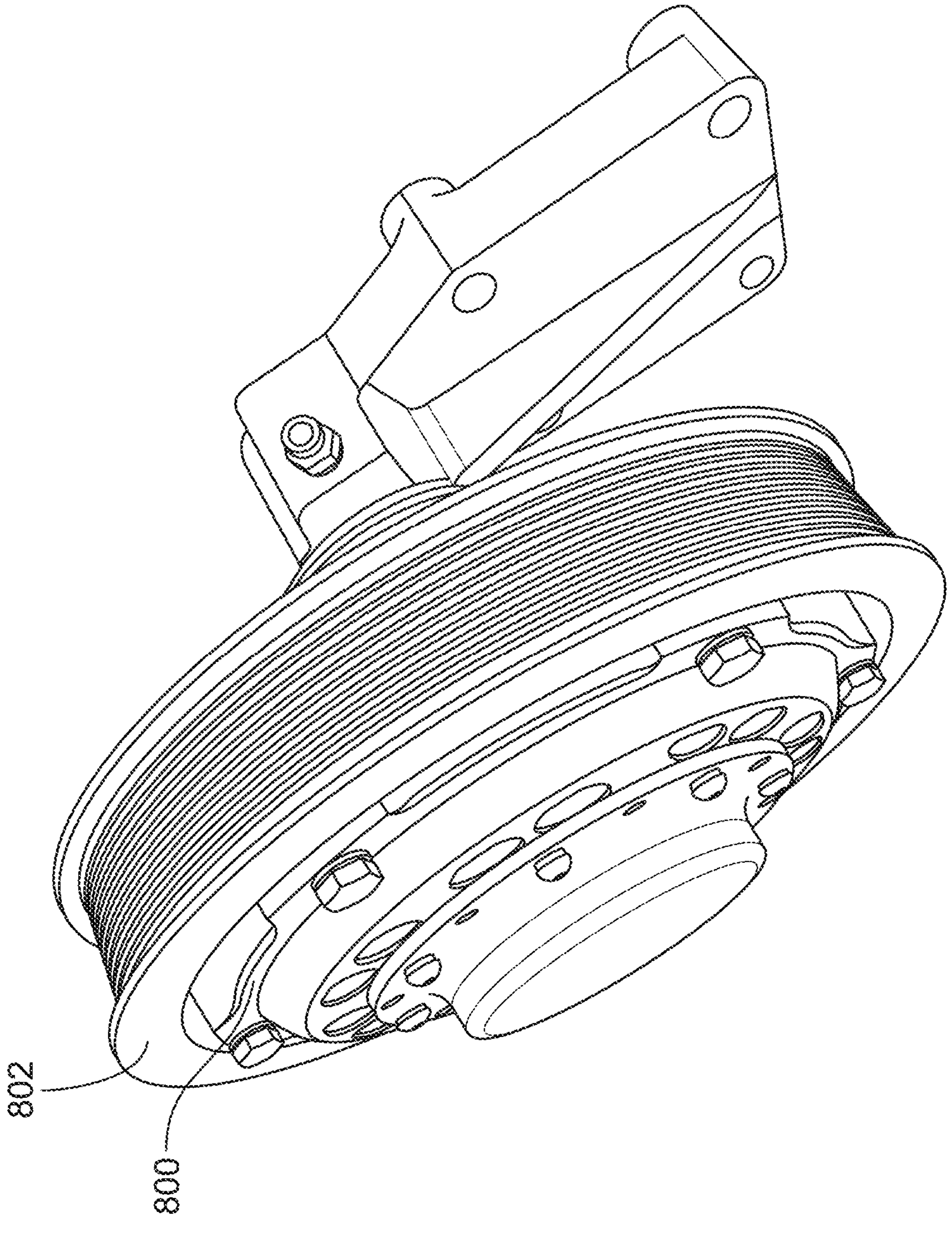
FIG. 6B is an example of a dry clutch that can be coupled to a drive belt associated with the supercharger shown in FIG. 6A.
Figure 6C:
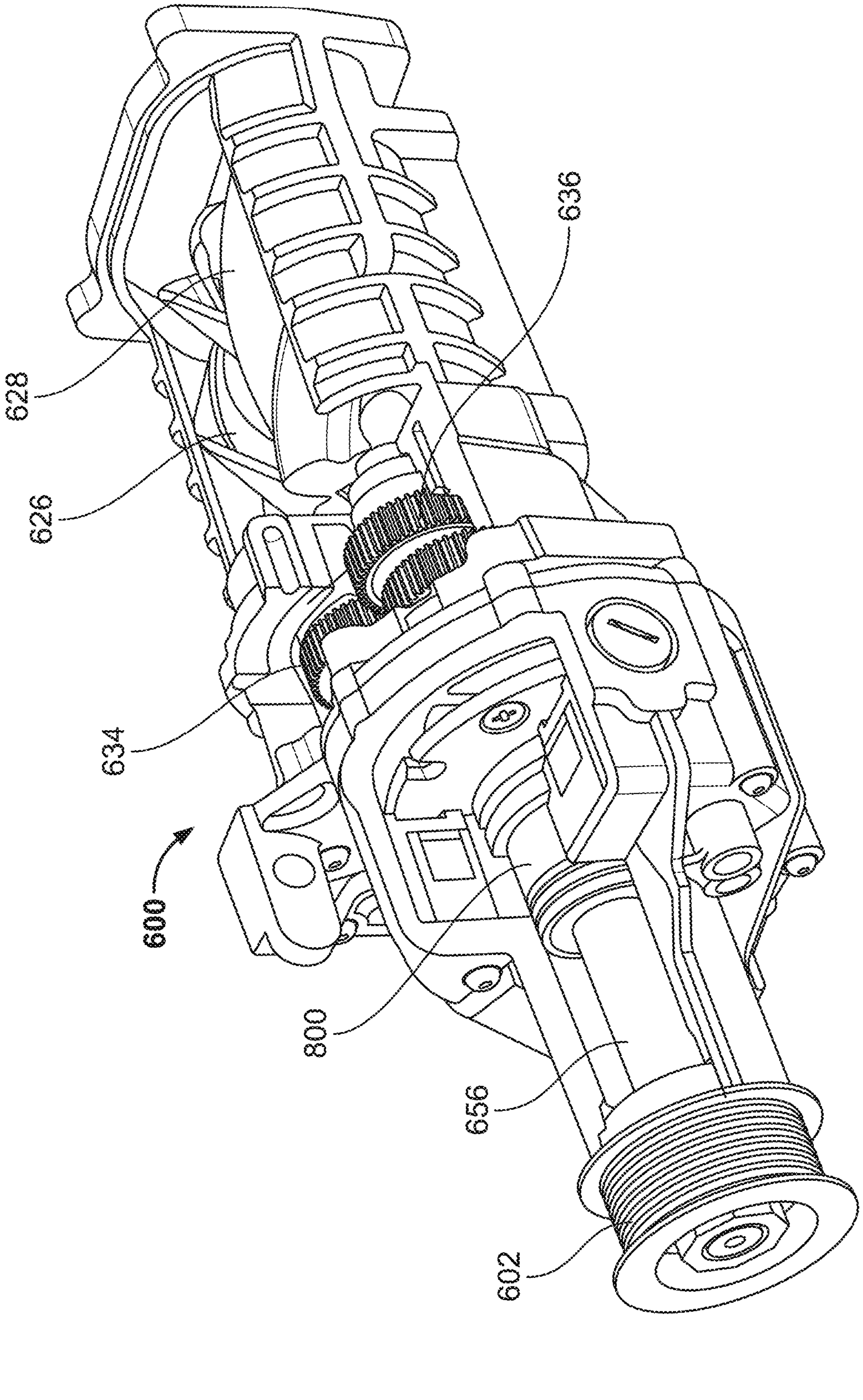
FIG. 6C is an example of the supercharger shown in FIG. 6A provided with an integrated magnetic clutch.

In one aspect, and as referenced at FIG. 6C, a first rotor 626 rotates on a first shaft and has multiple lobes that mesh via a set of intermeshing timing gears 634, 636 with multiple lobes of a second rotor 628. It should be understood that the rotors 626, 628 mesh in that their lobes interfit with one another when the rotors 626, 628 are rotating. However, the lobes of the rotors 626, 628 do not contact one another. The second rotor 628 rotates on a second shaft which is driven through the set of intermeshing timing gears 634, 636. Specifically, a first gear 634 is mounted on the first shaft to rotate with the first rotor 626. A second gear 636 is mounted on the second shaft to rotate with the second rotor 628. The first gear 634 meshes with the second gear 636. One of the first and second shafts is either directly or indirectly coupled (e.g., via a geartrain) to an input/output shaft 656 which is in turn coupled to pulley 602.

In embodiments, a clutch 800 is provided for selective engagement and disengagement of the supercharger 600 from the engine. An example of clutch 800 is shown at FIG. 6B, wherein the clutch 800 is configured as a dry clutch that is operatively coupled with the one or more belts via a pulley 802. A clutch with similar features is disclosed in International PCT Publication Number WO 2014/150265A2, entitled Dual Ratio Drive for Variable Speed Hybrid Electric Supercharger Assembly, the entirety of which is incorporated by reference herein. This control over the supercharging process allows for a more nuanced approach to use of the supercharger. For example, by disengaging the supercharger during regular driving conditions or low-load scenarios, the clutch helps conserve energy and enhance overall efficiency. This deliberate disconnection also contributes to improved fuel efficiency and reduced wear on engine components. In embodiments, clutch 800 is a two-position clutch, with a first, engaged position and a second, neutral position. A two-position clutch will generally provide a single ration between the drive, or crankshaft, speed and supercharger speeds. Examples include clutched superchargers used in the automotive gasoline applications, such as a supercharger connected only when needed with an integrated magnetic clutch. An example supercharger and clutch arrangement suitable for use with the principles described herein is shown and described in the WO '265 publication.

Actuation of clutch 800 may be performed, for example, by either a pneumatic or an electrical actuator, such as a linear actuator, commanded by an electrical control unit or operated manually. Clutch 800 may be arranged, in association with the supercharger, according to engine packaging needs. For example, the clutch may be configured on a front-end accessory device, in a supercharger assembly, or geared into the crankshaft, e.g., via the engine flywheel or similar. Clutch 800 may be configured as a two-way clutch, which is either engaged or disengaged (i.e., neutral), or as a three-way clutch, which is either disengaged, engaged in with a first gear ratio, or engaged with a second gear ratio. In either configuration, the clutch 800 may be referred to as a two-speed clutch having first and second gear ratios.

Figure 6D:
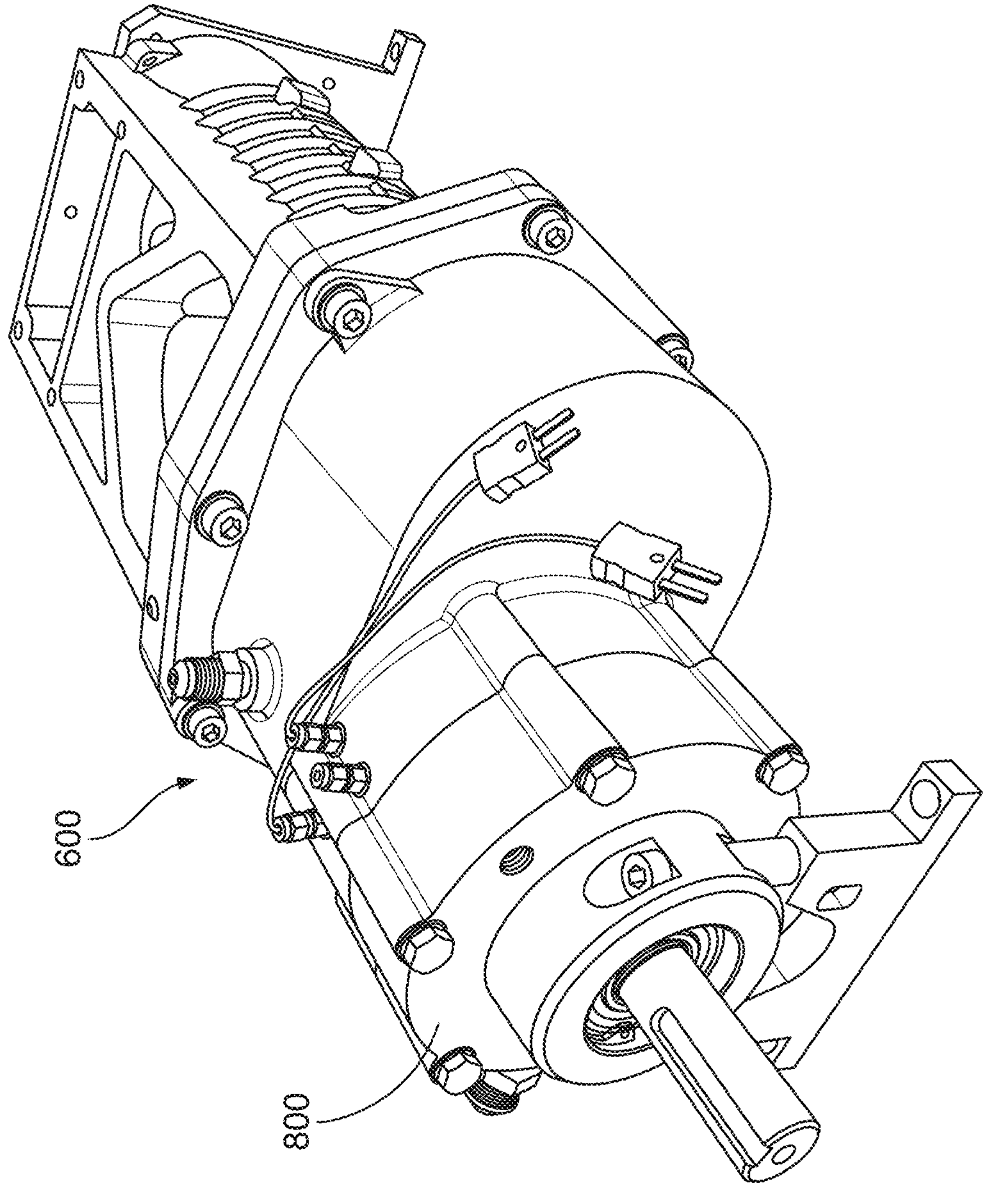
FIG. 6D is an example of the supercharger shown in FIG. 6A provided with a drive belt coupled with a multi-plate clutch.
Figure 6E:
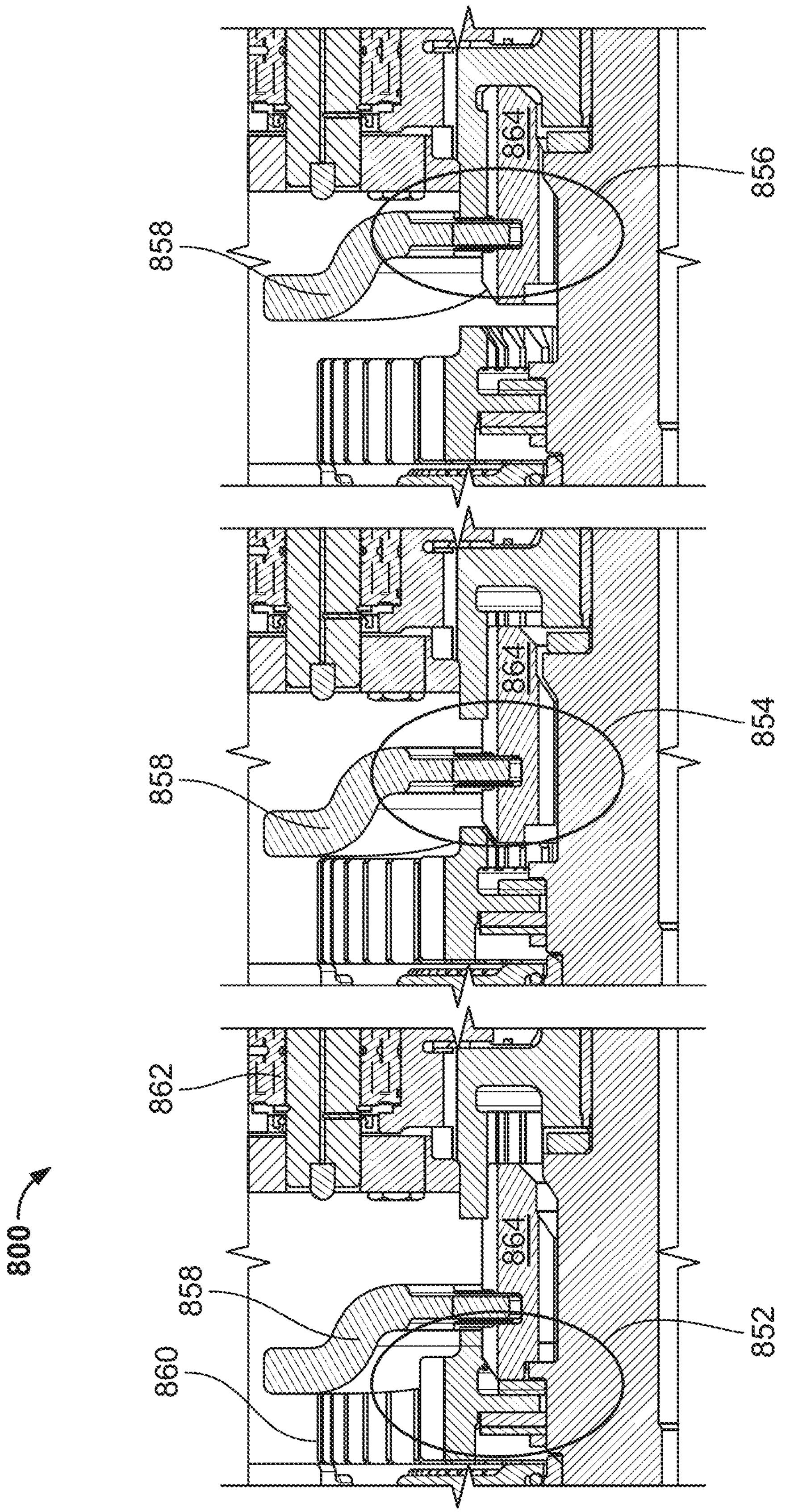
FIG. 6E is an example of a three-way clutch that can be coupled to or integrated with the supercharger shown in FIG. 6A.

In accordance with the above, other types of clutch systems are usable for clutch 800. For example, as illustrated FIG. 6C, the supercharger 600 can be provided with an integrated magnetic clutch 800. Other examples include clutched superchargers used to boost heavy duty diesel applications, such as the drive belt coupling at the engine front-end accessory drive using a wet multi-plate clutch, a wet double cone clutch, a dry clutch, etc. FIG. 6D is an example of drive belt coupled with a wet multi-plate clutch. FIG. 6E is an example of a three-way clutch 800. Clutch 800 includes positions for two gear ratios 852, 856 and a neutral position 854. In a first position 852, actuator 858 is moved to the left which likewise moves a dog clutch gear 864 to the left to engage with a gear 860. In a neutral position 854, actuator 858 moves dog clutch gear 864 to be between and disengaged from gears 860, 862. In a second position 856, actuator 858 is moved to the right which likewise moves the dog clutch gear 864 to the right to engage with gear 862. In embodiments, the two ratios are different ratios.

The controlled boost afforded by the clutch 800 supports performance tuning, offering the flexibility to manually engage or disengage the supercharger based on power or braking requirements. Furthermore, clutch 800 may extend the life of the supercharger and associated parts. By minimizing unnecessary strain during periods when supercharging is not essential, the clutch contributes to the longevity of these components. While not all supercharger systems incorporate clutches, their presence is a design choice that aligns with specific performance and efficiency goals for a given use.

In embodiments, additional braking power is obtained from the supercharger by running the supercharger at a higher speed. For example, incorporation of a two-speed ratio device supports a first ratio for boosting and a second ratio for braking. Ratio devices adjust the relationship between input and output parameters. The ratio device may be used to modify the speed, torque, or direction of rotational motion to meet specific operational requirements. In embodiments, the ratio device is incorporated with a clutch associated with the supercharger, such as clutch 800 of FIG. 6A. The ratio device may be incorporated, for example, in the belt pulley drive clutch housing or in the gear takeoff at the flywheel, e.g., for a rear engine mount implementation.

When clutch 800 is configured as a three-way clutch, such as is described above and/or in the WO '265 publication, the clutch 800 can provide a neutral or disengaged state, first gear ratio for nominal operation, and a second, different, gear ratio for braking operation. In this way, clutch 800 integrally serves as the ratio device for supercharger 600. In some cases, the second gear ratio is a faster or higher ratio than the first gear ratio. Neutral, in embodiments, is used to decouple the supercharger 600 when operation of the supercharger 600 is not needed or desired by the a user. Decoupling the supercharger 600 when not desired aides in reducing engine parasitic losses.

Approaches for Increasing Pressure Ratio Across Supercharger 600

In embodiments, the braking load may be further increased by increasing the power consumption of the supercharger to further strengthen the engine braking. For example, the system is configured to increase the pressure ratio (e.g., outlet pressure/inlet pressure) of the supercharger by adding a restriction, such as an operable valve, and/or by further controlling the position and timing of the intake valves. On the outlet side, providing an additional restriction produces an increase in the outlet pressure and, on the inlet side, provides a decrease in the inlet pressure of the supercharger, in effect increasing both the pressure ratio across the supercharger and the work. If mass flow decreases, due to lower inlet density, while keeping the supercharger speed constant, power will still increase.

With reference to FIGS. 7A-7D, approaches for increasing the pressure ratio across the supercharger 600, by increasing backpressure or causing an inlet pressure depression, are presented. By increasing the pressure ratio across the supercharger 600, pumping losses through the supercharger 600 are increased, which in turn creates additional braking power during an engine braking process via parasitic losses. One way to increase the pressure ratio across the supercharger 600 is to provide a controllable valve or orifice located at an inlet or outlet of the supercharger, as is illustrated in the examples shown in FIGS. 7A-7C.

Figure 7A:
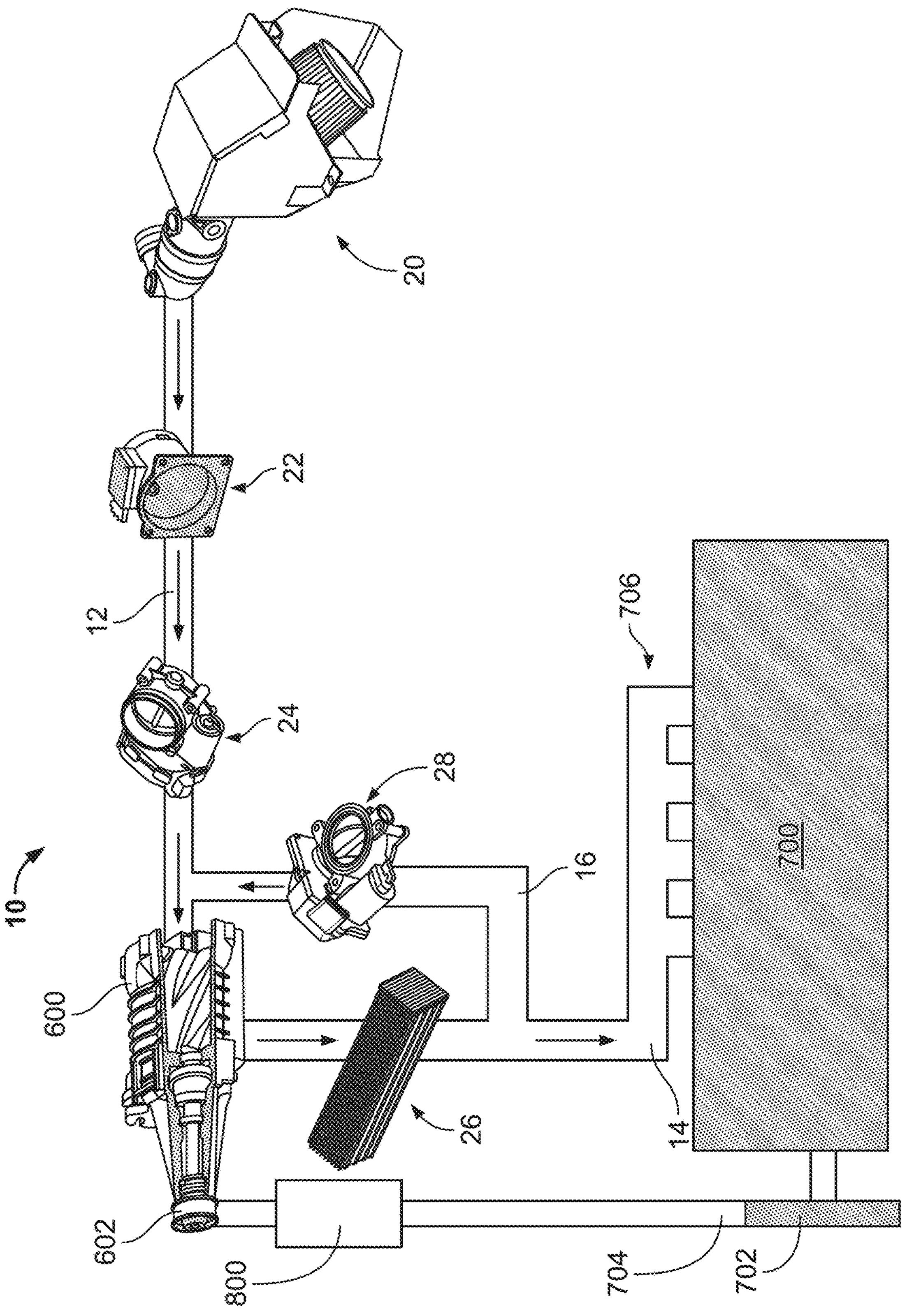
FIGS. 7A-7C present examples for increasing a pressure ratio across the supercharger shown in FIGS. 6A-6B.

With reference to FIG. 7A, a system 10 is shown as including a power plant 700 configured as an internal combustion engine 700 configured for use with a hydrogen fuel source. The internal combustion engine 700 is shown as including the above-described accessory or supercharger pulley 702 and drive belt 704 and is also shown as including an intake manifold 706. In one aspect, the system 10 is also shown as including an airflow pathway 12 extending from an air intake or filter arrangement 20 to an intake side of the supercharger 600. A mass airflow sensor 22 and a throttle 24 are shown as being disposed within the airflow pathway 12. The system 10 is further shown as including an outlet airflow pathway 14 extending from an outlet of the supercharger 600 to the intake manifold 706. An air-water intercooler 26 is shown as being disposed within the outlet airflow pathway 14. A bypass airflow pathway 16 is also shown as extending from the outlet side of the supercharger 600, downstream of the air-water intercooler 26, to the intake side of the supercharger 600, at a location between the throttle 24 and the supercharger 600. A bypass valve 28 is shown as being disposed within the bypass pathway 16, as is also illustrated at FIG. 6A. In some arrangements, the bypass valve 28 can be configured as a three-way valve connecting the airflow pathways 14, 16 and operable to divert some or all of the flow from the supercharger 600 to the bypass pathway 16 or to the manifold 706. The airflow pathways 12, 14, 16 may be formed by ductwork, hoses, conduits, internal passageways of the components within the system, and combinations thereof. For example, the bypass airflow pathway 16 can be integrated into the supercharger housing or provided externally with conduits or hoses. With the configuration shown in FIG. 7A, the engine braking processes described above in relation to FIGS. 2 to 4B is performed with the bypass valve 28 in the closed position such that all air delivered to the intake manifold 706 must be delivered by the supercharger 600. Where the clutch 800 is provided as a two-speed clutch, the clutch 800 can be placed in the high-speed gear ratio during the braking process, as already described above. In some examples, additional resistance can be achieved by operating the position of the throttle 24, independently or in concert with the bypass valve 28, to increase the pressure ratio or pressure differential across the supercharger 600. In some examples, additional resistance can be achieved by operating the position and timing of the engine intake valves to create backpressure for the supercharger 600. These strategies can also be implemented in conjunction with the examples presented in FIGS. 7B and 7C. This configuration also allows for the supercharger to operate in a vacuum while cruising which reduces input power requirements.

Figure 7B:
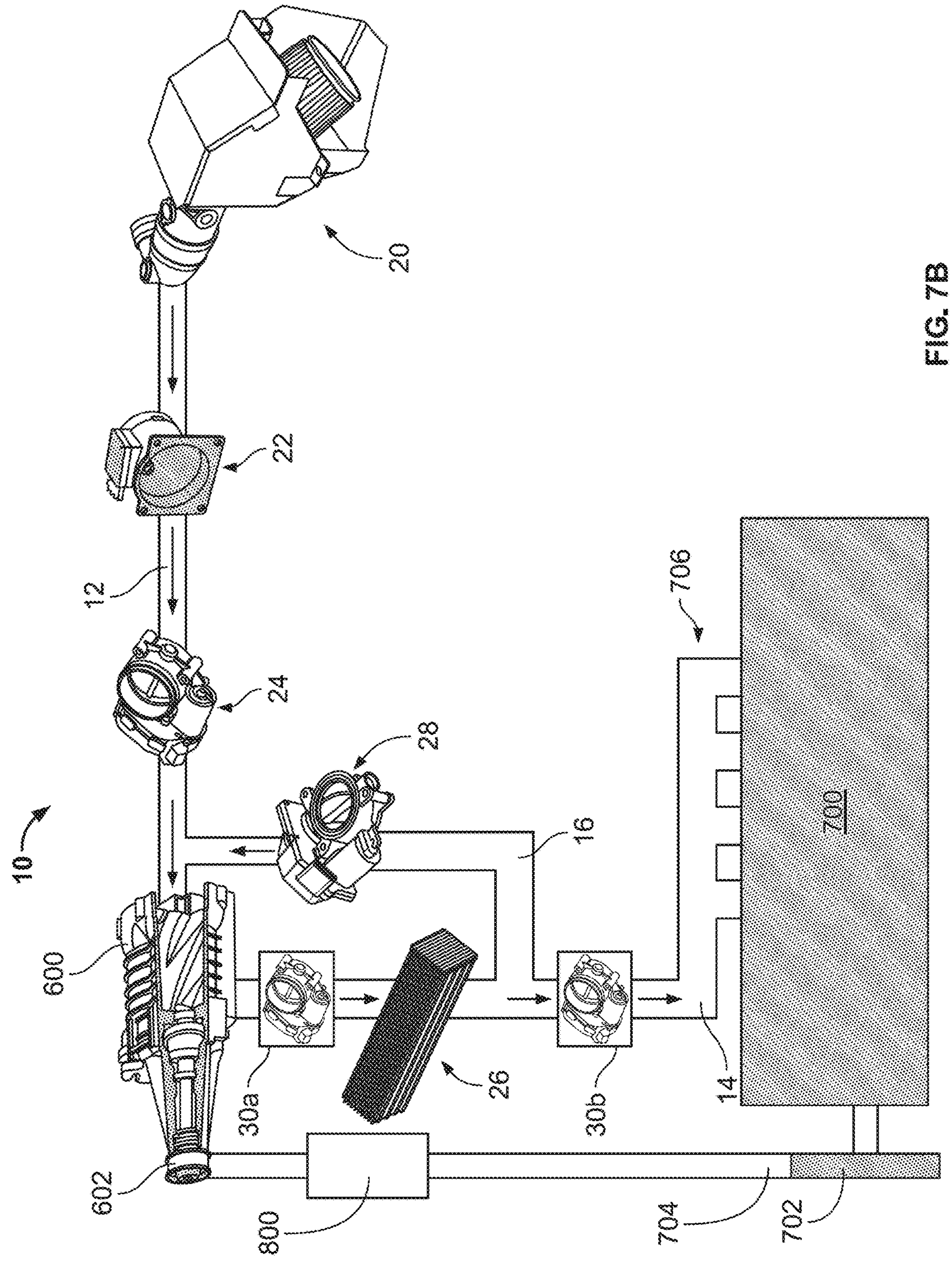

With reference to FIG. 7B, an alternative configuration is shown in which additional backpressure valves 30*a*, 30*b* are provided in the outlet airflow pathway 14 and in which the clutch 800 is configured with two different gear ratios. Although two backpressure valves 30*a*, 30*b* are shown, more or fewer could be provided. In one aspect, the backpressure valve 30*a* is shown as being located between the supercharger 600 and the bypass pathway 16 while the backpressure valve 30*b* is shown as being located between the manifold 706 and the bypass pathway 16. Although some locations may provide various advantages, the backpressure valves 30*a*, 30*b* can be located at any point in the outlet airflow pathway 14, and can also be added to the inlet airflow pathway 12. In one aspect, the backpressure valves 30*a*, 30*b* are configured to purposefully increase parasitic pumping losses of the supercharger 600 to effectively provide additional braking of the engine 700. Accordingly, with the configuration shown in FIG. 7B, the engine braking processes described above in relation to FIGS. 2 to 4B is performed with the bypass valve 28 in the closed position such that all air delivered to the intake manifold 706 must be delivered by the supercharger 600 and through valves 30*a*, 30*b* with the clutch 800 in the high-speed gear ratio. In some examples, the valves 30*a*, 30*b* are positioned by the controller 500 to either a preset position or are throttled to meet a specified operational setpoint, for example, a pressure ratio setpoint or pressure differential setpoint across the supercharger 600. As with the configuration shown at FIG. 7A, this configuration also allows for the supercharger to operate in a vacuum while cruising, which reduces input power requirements.

Figure 7C:
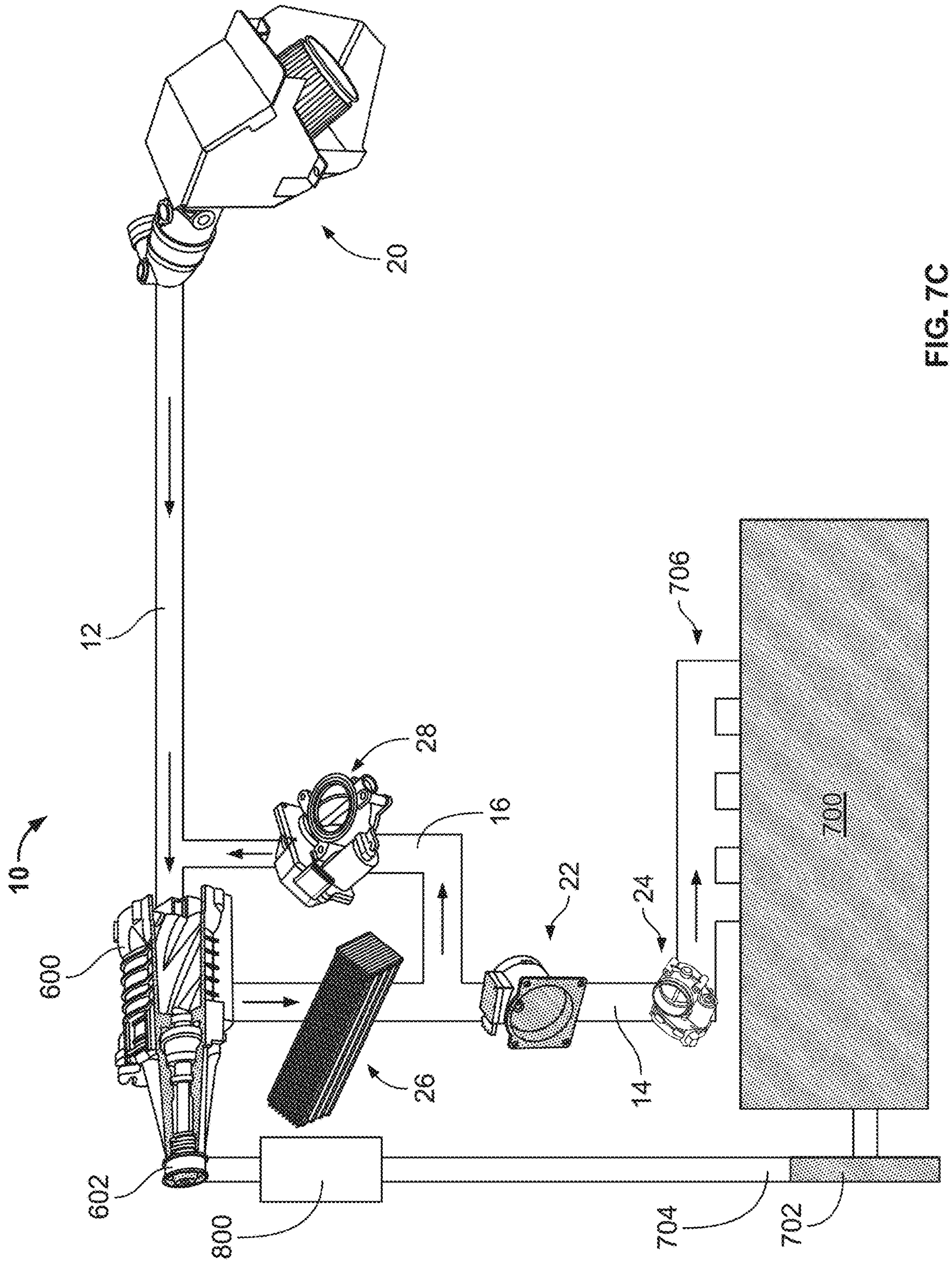

With reference to FIG. 7C, an alternative configuration is shown in which the mass airflow sensor 22 and throttle 24 are located within the outlet airflow pathway 14, between the bypass airflow pathway 16 and the intake manifold 706. In some arrangements, the clutch 800 is configured with two different gear ratios. With such a configuration, the throttle 24 and bypass valve 28 work in conjunction during braking with the throttle 24 being controlled based on a desired mass flow and the bypass valve 28 being controlled to maintain a desired pressure ratio. Under normal operation, the bypass valve 28 would be typically open when the throttle 24 is closed. However, under braking in accordance with the processes is described above in relation to FIGS. 2 to 4B, the bypass valve 28 can be actively controlled to maintain a pressure ratio or pressure differential across the supercharger 600. Where a two-speed clutch is utilized, the clutch 800 can be engaged in the high-speed gear ratio during implementation of the braking process. This configuration maintains only a small volume at sub-atmospheric pressure between the throttle and the intake which provides for quick response time.

Figure 7D:
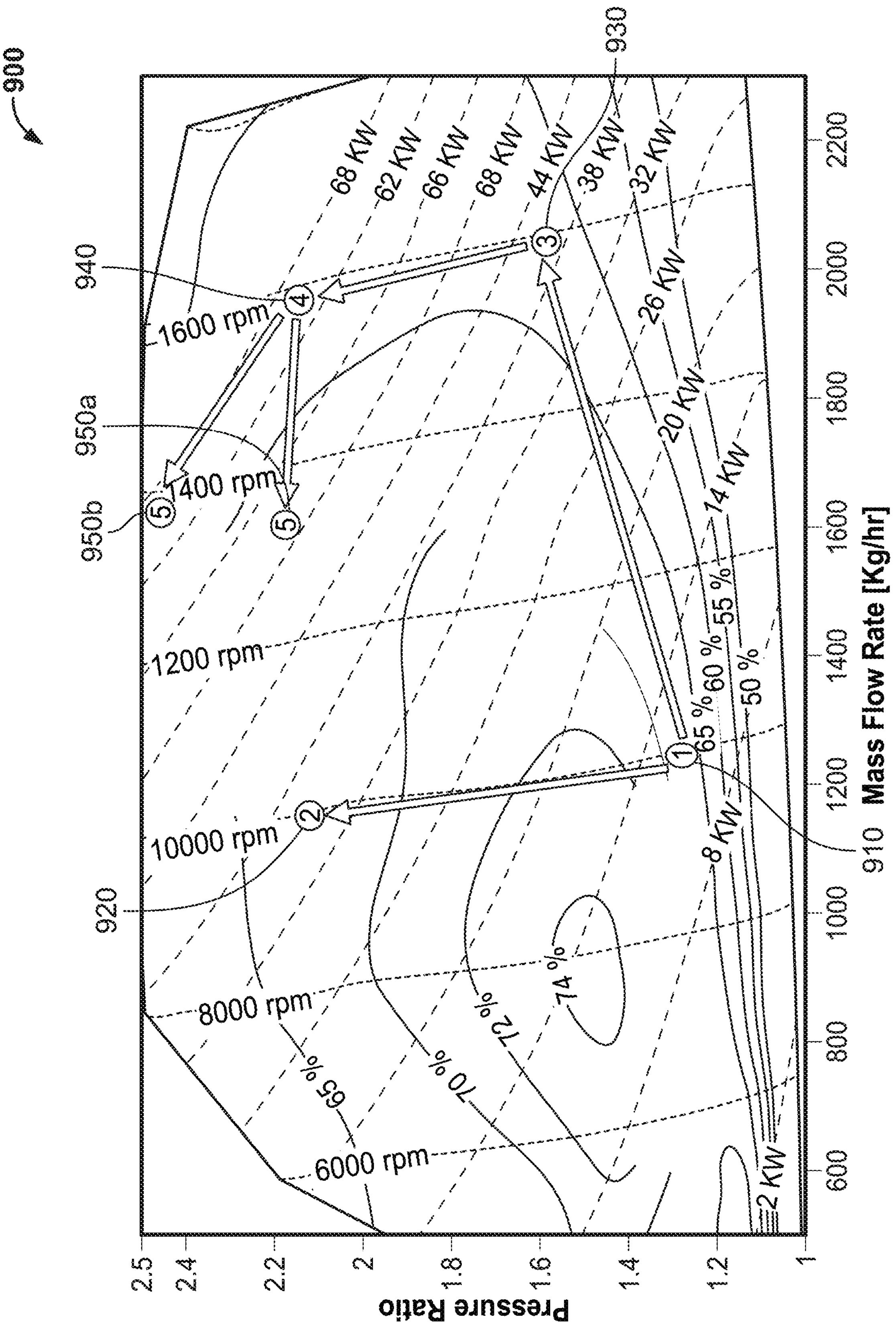
FIG. 7D shows a power map demonstrating the effectiveness of increasing the pressure ratio to increase the load exerted by the supercharger.

With reference to FIG. 7D, power map 900 is shown to demonstrate the effectiveness of increasing the pressure ratio to increase the load exerted by the supercharger. As discussed above, the pressure ratio across the supercharger can be increased by implementing the above-described restriction strategies using one or more valves 24, 28, 30*a*, 30*b* in the inlet, outlet, and/or bypass airflow streams 12, 14. FIG. 7D shows an example in which such a strategy is implemented, whereby the pressure ratio is increased from a normal operating condition 910, having a pressure ratio between 1.2 and 1.4 to a second condition 920, having a pressure ratio between 2.0 and 2.2, without changing the speed of the supercharger 600 via clutch 800. This pressure ratio change, which represents about a 50 to 60 percent increase, can result in an associated parasitic power loss of the supercharger 600 of over 150 percent in comparison to the baseline condition 910. To illustrate, calculations show that for an example supercharger system associated with the power map 900, a 1900 cc supercharger 600 operating at 10,000 rpm has been shown to have a 37 KW power loss at condition 920 in comparison to a power loss of 14 KW at the baseline condition 910. This effect can be further increased when changing the speed of the supercharger, as is shown at conditions 930, 940, and 950. At condition 930, the speed of the supercharger 600 is increased, for example from 10,000 rpm or below at condition 910 to 16,000 rpm at condition 930, which results in a pressure ratio increase to about 1.6, but at a significantly higher mass flow rate in comparison to condition 910. Accordingly, the above-described supercharger example can be expected to have a power loss of about 39 KW in condition 930 which represents a 172 percent increase in power loss over the baseline condition 910. Based on the operation and configuration of the restriction valves via any of the above-described approaches, the pressure ratio can be further increased from condition 940 to between 2.2 and 2.5 at conditions 950*a*, 959*b*, respectively, albeit at a reduced mass flow rate in comparison to condition 930. Even at the lower pressure ratio condition 950*a*, the resulting power loss for the supercharger example described above increases to about 66 KW which represents a 359 percent increase in power loss over the baseline condition 910.

Controller 500

Figure 8:
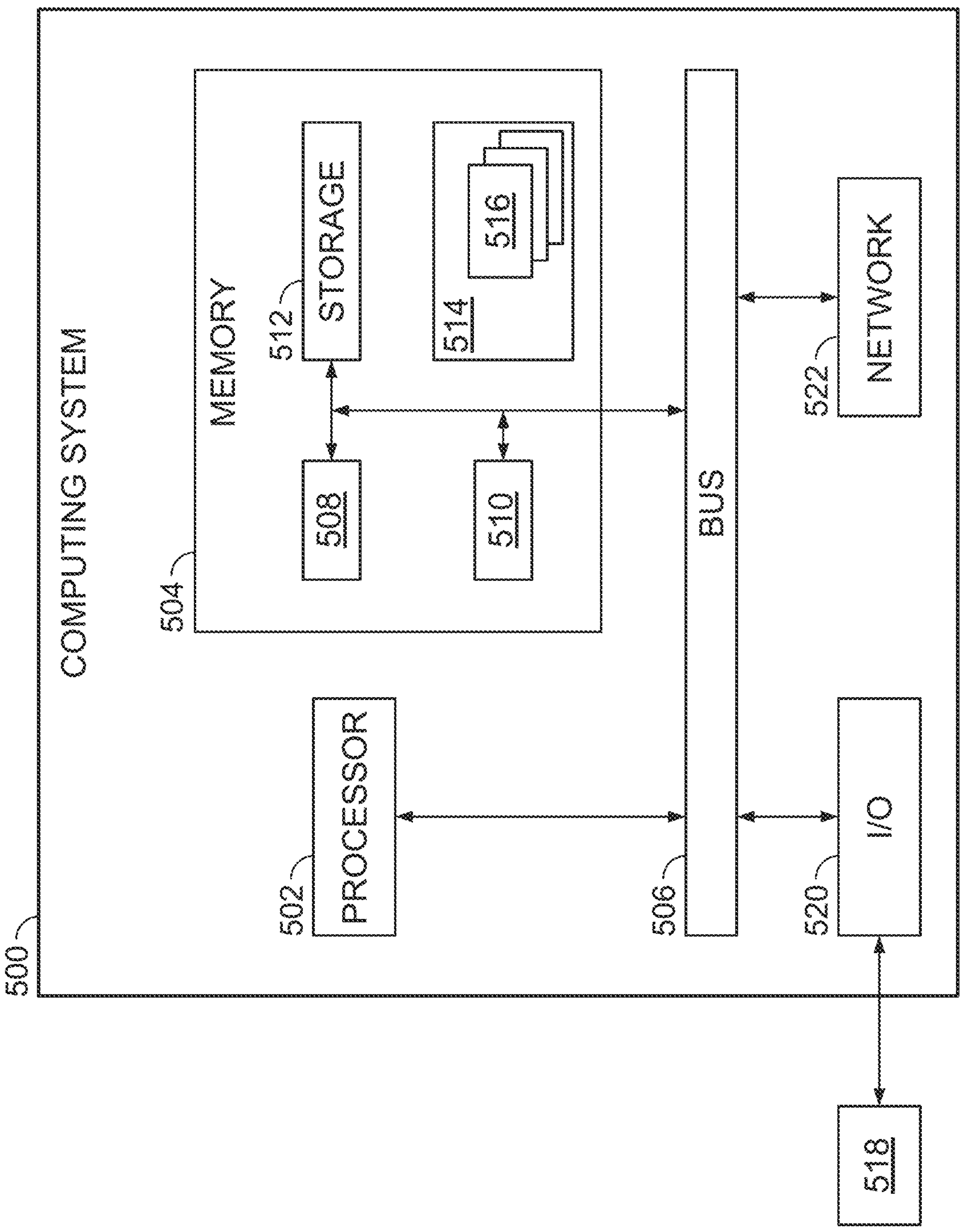
FIG. 8 is a block diagram of an example computer system, upon which systems and method embodying aspects of the present disclosure may operate.

Embodiments of the systems and methods disclosed herein can be implemented on a computing device, such as an electronic controller. Referring now to FIG. 8, a block diagram of an example of a controller 500 is shown, upon which aspects of the present disclosure may be implemented. In embodiments, controller 500 is deployed as a component of a cloud computing node.

Controller 500 can work with other general purpose or special purpose computing system environments or configurations. Examples of well-known computing systems, environments, or configurations that may be suitable for use with controller 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Controller 500 may be described in the general context of computer system-processing instructions, such as program modules, being processed by a computer system. Generally, program modules may include routines, programs, objects, components, logic, data structures, and so on that perform particular tasks or implement particular abstract data types. Controller 500 may be practiced in distributed cloud computing environments where tasks are performed by remote processing devices that are linked through a communications network. In a distributed cloud computing environment, program modules may be located in both local and/or remote computer system storage media including memory storage devices.

As depicted in FIG. 8, controller 500 is shown in the form of a general-purpose computing device. The components of controller 500 may include, but are not limited to, one or more processors 502, memory 504, and bus 506 that couples various system components, including memory 504, to processor 502.

Processor 502 processes instructions for software that may be loaded into memory 504. Processor 502 may be a number of processors, a multi-processor core, or some other type of processor, depending on the particular implementation. Further, processor 502 may be implemented using one or more different processor systems in which a main processor is present with secondary processors, and may be on a single chip. In another example, processor 502 may be a symmetric multi-processor system containing multiple processors of the same type.

Bus 506 represents one or more of any of several types of bus structures, including a memory bus or memory controller, a peripheral bus, an accelerated graphics port, and a processor or local bus using any of a variety of bus architectures. By way of example and not limitation, such architectures include Industry Standard Architecture (ISA) bus, Micro Channel Architecture (MCA) bus, Enhanced ISA (EISA) bus, and Peripheral Component Interconnects (PCI) bus.

Controller 500 may include a variety of computer system readable media. Such media may be any available media that is accessible by controller 500 and includes both volatile and non-volatile media and removable and non-removable media.

Memory 504 can include computer system readable media in the form of volatile memory, such as random access memory (RAM) 508 and/or cache 510. Controller 500 may further include other removable/non-removable, volatile/non-volatile computer system storage media. By way of example only, storage system 512 can be provided for reading from and writing to a non-removable, non-volatile magnetic media, such as a hard drive. Although not shown, a magnetic disk drive for reading from and writing to a removable, non-volatile magnetic disk, and an optical disk drive for reading from or writing to a removable, non-volatile optical disk, or other optical media can be provided. In such instances, each can be connected to bus 506 by one or more data media interfaces. Memory 504 may include at least one program product having a set of program modules that are configured to carry out the functions of embodiments of the invention. As used herein, a set, when referring to items, means one or more items. For example, a set of program modules is one or more program modules.

Program 514, having a set of program modules 516, may be stored in memory 504, by way of example, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention as described herein. Program modules 516 include fusion module 514, weight/confidence module 418, and fault detection module 520.

Controller 500 may also communicate with one or more external devices 518, such as a keyboard, a mouse, a display, or one or more other devices to enable a user to interact with controller 500. External devices 518 may further include any devices (e.g., network card, modem, etc.) that enable controller 500 to communicate with one or more other computing devices. These communication can occur via I/O interface 520. I/O interface 520 may correspond to external interface 518. Controller 500 can communicate with one or more networks, such as a local area network (LAN), a general wide area network (WAN), or a public network, such as the Internet via network adapter 522.

Network adapter 522 communicates with other components of controller 500 via bus 506. Other hardware and/or software components, which may not be depicted in FIG. 5, are able to be used with controller 500. Examples include, but are not limited to, microcode, device drivers, redundant processor units, external disk drive arrays, RAID systems, tape drives, and data archival storage systems, etc.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method of enhancing decompression engine braking to offset reduced power braking potential in a low compression internal combustion engine, the method comprising:

initiating an engine braking operation in the internal combustion engine, wherein the internal combustion engine consumes a hydrogen fuel and has a compression ratio in a normal operating mode of no more than 14:1;

boosting intake manifold pressure with an air compressor to create a boosted airflow stream;

introducing the boosted airflow stream air into a cylinder of the internal combustion engine;

compressing the air in the cylinder with a piston; and releasing the compressed air from the cylinder in a controlled compression release event.

2. The method of claim 1, wherein increasing pressure in the cylinder with the air compressor occurs when the piston is at bottom dead center of the cylinder.

3. The method of claim 1, wherein the air compressor is one of a supercharger, a booster, an e-booster, a turbo, and an e-turbo.

4. The method of claim 3, wherein the air compressor is the supercharger and the supercharger comprises a clutch.

5. The method of claim 4, wherein the clutch is a three-way clutch.

6. The method of claim 5, wherein the three-way clutch comprises: a neutral position; a first gearing position for driving; and a second gearing position for braking.

7. The method of claim 6, wherein the second gearing position operates the supercharger at a higher speed than the first gearing position.

8. The method of claim 3, wherein the air compressor comprises a ratio device with at least two speeds.

9. The method of 8, wherein the at least two speeds comprise a first speed for driving operations and a second, faster, speed for braking operations.

10. The method of claim 1, wherein the air compressor exerts a parasitic load on the internal combustion engine.

11. The method of claim 1, wherein the air compressor comprises a throttle valve in an inlet stream.

12. The method of claim 1, wherein the internal combustion engine has a compression ratio within a range of 10:1 to 13:1.

13. The method of claim 1, further comprising:

drawing air into the cylinder during a second intake stroke by the piston, wherein the internal combustion engine has a four-revolution cycle of a crankshaft of internal combustion engine and the second intake stroke is a third revolution of the four-revolution cycle;

adding, during the second intake stroke, additional air into the cylinder with the air compressor;

compressing the air in the cylinder during an exhaust stroke by the piston; and releasing the compressed air from the cylinder.

14. A system for decompression braking in a low compression internal combustion engine, the system comprising:

a hydrogen internal combustion engine (H2 ICE) having at least one cylinder, the at least one cylinder including a piston and an intake valve;

an air compressor in communication with the intake valve; and a controller having a propulsion mode and a braking mode, wherein the air compressor is operated by the controller during the braking mode to supply air to the cylinder during an intake stroke by the piston.

15. The system of claim 14, wherein the intake valve has a lift height and a lift duration and at least one of the lift height and the lift duration is reduced during the braking mode in comparison to the lift height and lift duration during the propulsion mode to increase the pressure ratio across the air compressor.

16. The system of claim 14, wherein the system includes a restriction valve arrangement operable in the braking mode to increase a pressure ratio across the air compressor during operation in the braking mode.

17. The system of claim 16, wherein the controller operates the air compressor at an increased rotational speed in the braking mode in comparison to a rotational speed of the air compressor in the propulsion mode.

18. A method of operating a system including a hydrogen internal combustion engine and a supercharger between a normal operating mode and an engine braking mode, the method comprising:

a) operating the system in the normal operating mode wherein the supercharger operates at a first rotational speed to deliver air to an intake manifold of the engine; and b) operating the system in the engine braking mode, the engine braking mode including:

i) operating the supercharger to deliver an airflow stream to the intake manifold;

ii) increasing a pressure ratio across the supercharger to increase parasitic losses by one or both of operating the supercharger at a second rotational speed higher than the first rotational speed and operating a restriction valve arrangement;

iii) introducing the airflow stream air into a cylinder of the internal combustion engine;

iv) compressing the air in the cylinder with a piston; and v) releasing the compressed air from the cylinder in a controlled compression release event.

19. The method of claim 18, wherein the step of increasing a pressure ratio across the supercharger includes operating the restriction valve arrangement.

20. The method of claim 19, wherein the step of increasing a pressure ratio across the supercharger includes operating the supercharger at the second rotational speed.

21. The method of claim 20, wherein the step of increasing a pressure ratio across the supercharger includes both operating the supercharger at the second rotational speed and operating the restriction valve arrangement.

22. The method of claim 19, wherein the restriction valve arrangement is located in either an inlet airflow pathway upstream of the supercharger or an outlet airflow pathway downstream of the supercharger.

23. The method of claim 19, wherein the system includes a throttle valve arrangement and a supercharger bypass valve arrangement that are separate from the restriction valve arrangement.

24. The method of claim 19, wherein the restriction valve arrangement includes a plurality of restriction valve arrangements.

25. The method of claim 19, wherein the restriction valve arrangement is located between the engine intake manifold and the supercharger.

26. The method of claim 23, wherein a mass airflow sensor is located between the supercharger and the engine intake manifold, and wherein one or both the throttle valve arrangement and the bypass valve arrangement is at least partially operated based on an input from the mass airflow sensor in the engine braking mode.

* * * * *